United States Patent [19]

Hester et al.

[11] Patent Number: 5,097,410
[45] Date of Patent: Mar. 17, 1992

[54] MULTIMODE DATA SYSTEM FOR TRANSFERRING CONTROL AND DATA INFORMATION IN AN I/O SUBSYSTEM

[75] Inventors: Richard L. Hester, Brackney, Pa.; Stefan P. Jackowski, Endicott, N.Y.; Peter N. James, Algonquin, Ill.; James T. Moyer, Endwell, N.Y.; Robert G. Rush, Endicott, N.Y.; Gregory S. Ulsh, Endicott, N.Y.; Mark J. Wolski, Endicott, N.Y.

[73] Assignee: International Business Machines Corporation, Armonk, N.Y.

[21] Appl. No.: 292,399

[22] Filed: Dec. 30, 1988

[51] Int. Cl.⁵ .................................. G06F 13/14
[52] U.S. Cl. .................................. 395/275; 364/241.9; 364/240.8; 364/260; 364/240.5; 364/DIG. 7; 395/250; 395/575
[58] Field of Search ... 364/200 MS File, 900 MS File

[56] References Cited

U.S. PATENT DOCUMENTS

| | | | |
|---|---|---|---|
| 3,675,209 | 7/1972 | Trost | 364/200 |
| 4,155,117 | 5/1979 | Mitchell | 364/200 |
| 4,287,562 | 9/1981 | Darden | 364/200 |
| 4,296,469 | 10/1981 | Gunter et al. | 364/200 |
| 4,325,119 | 4/1982 | Grandmaison | 364/200 |
| 4,366,538 | 12/1982 | Johnson | 364/200 |
| 4,367,525 | 1/1983 | Brown | 364/200 |
| 4,371,932 | 2/1983 | Dinwiddie | 364/200 |
| 4,381,540 | 4/1983 | Lewis | 364/200 |
| 4,384,322 | 5/1983 | Bruce et al. | 364/200 |
| 4,393,501 | 7/1983 | Kellogg et al. | 371/33 |
| 4,417,334 | 11/1983 | Gunderson | 364/200 |
| 4,445,176 | 4/1984 | Burk | 364/200 |
| 4,449,182 | 5/1984 | Rubinson | 364/200 |
| 4,493,028 | 1/1985 | Heath | 364/200 |
| 4,571,671 | 2/1986 | Burns | 364/200 |
| 4,648,029 | 3/1987 | Cooper | 364/200 |
| 4,672,537 | 6/1987 | Katzman et al. | 364/200 |
| 4,710,935 | 12/1987 | Kim et al. | 371/49 |
| 4,722,048 | 1/1988 | Hirsch | 364/200 |
| 4,751,634 | 6/1988 | Burrus, Jr. et al. | 364/200 |
| 4,783,730 | 11/1988 | Fischer | 364/200 |
| 4,835,674 | 5/1989 | Collins | 364/200 |

Primary Examiner—Thomas C. Lee
Assistant Examiner—Eric Coleman
Attorney, Agent, or Firm—Baker, Maxham, Jester & Meador

[57] ABSTRACT

A system structured to transfer control information between an IFA (I/O interface adapter) and an I/O processor, and I/O data between an IFA and a CDB (channel data buffer) has separate interfaces for these transfers. The control interface includes a multi-mode, bidirectional control data bus, a control mode bus for establishing the mode of the bus, and a check interface on which the IFA provides error information. The data interface includes a multi-mode, bidirectional data transfer bus, respective SYNC and ACCEPT lines for transferring time-phased control signals to establish the mode of the data transfer bus, and a parity line to indicate to the IFA the parity of the SYNC and ACCEPT lines.

14 Claims, 15 Drawing Sheets

SYNCRONOUS COMMAND
AND TRAP FRAME
FORMAT

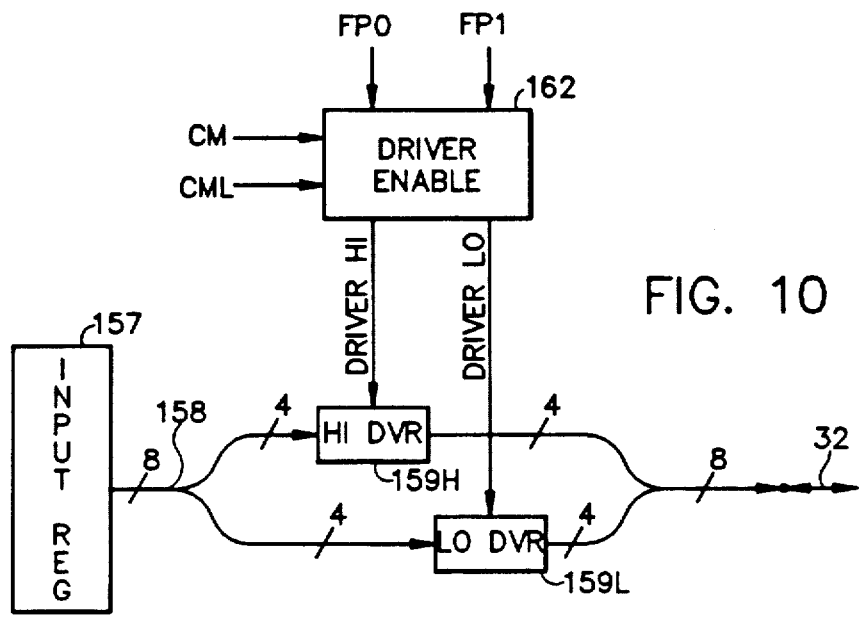
FIG. 10
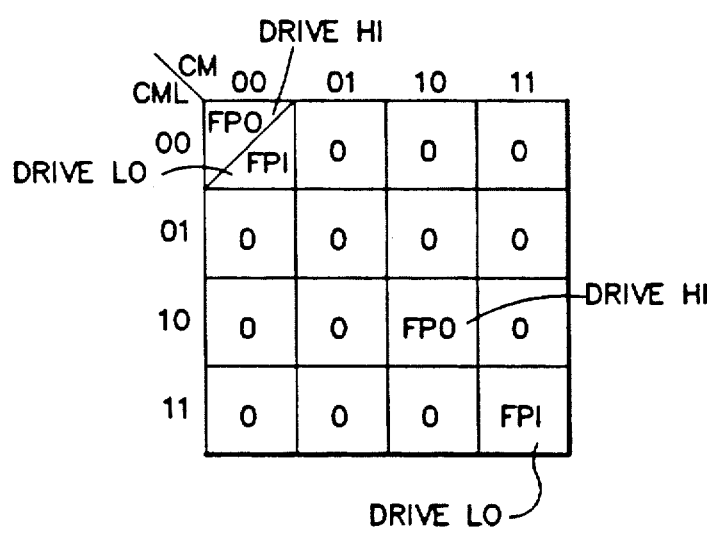
FIG. 11
FIG. 12

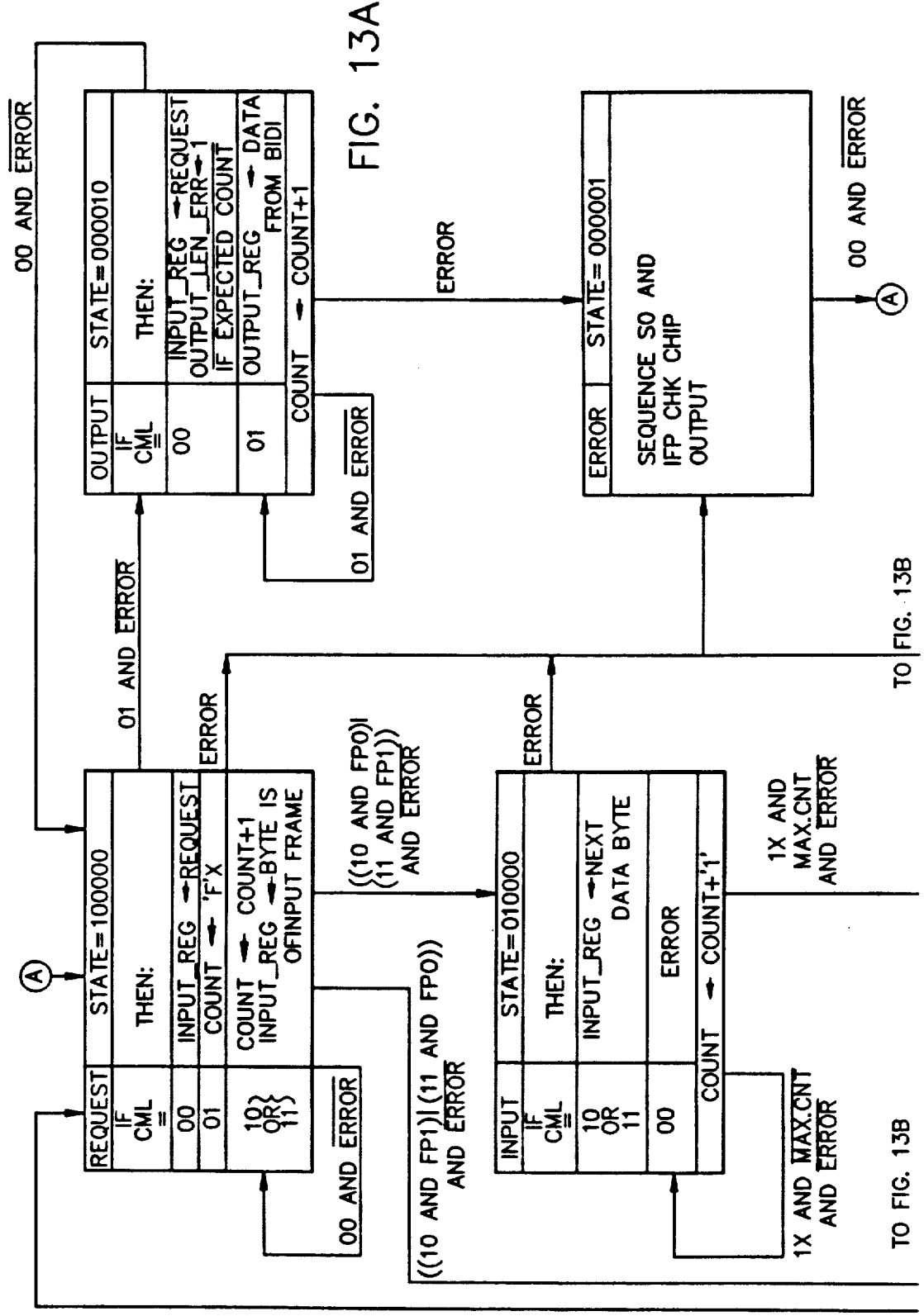

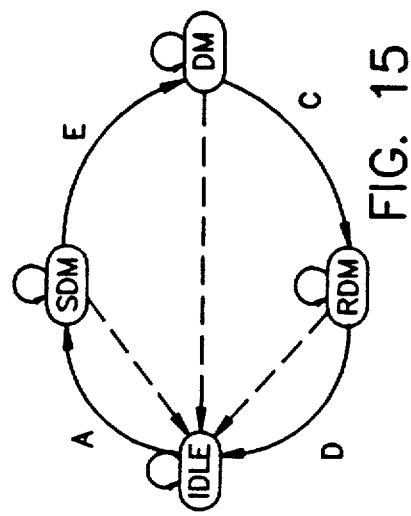
FIG. 15
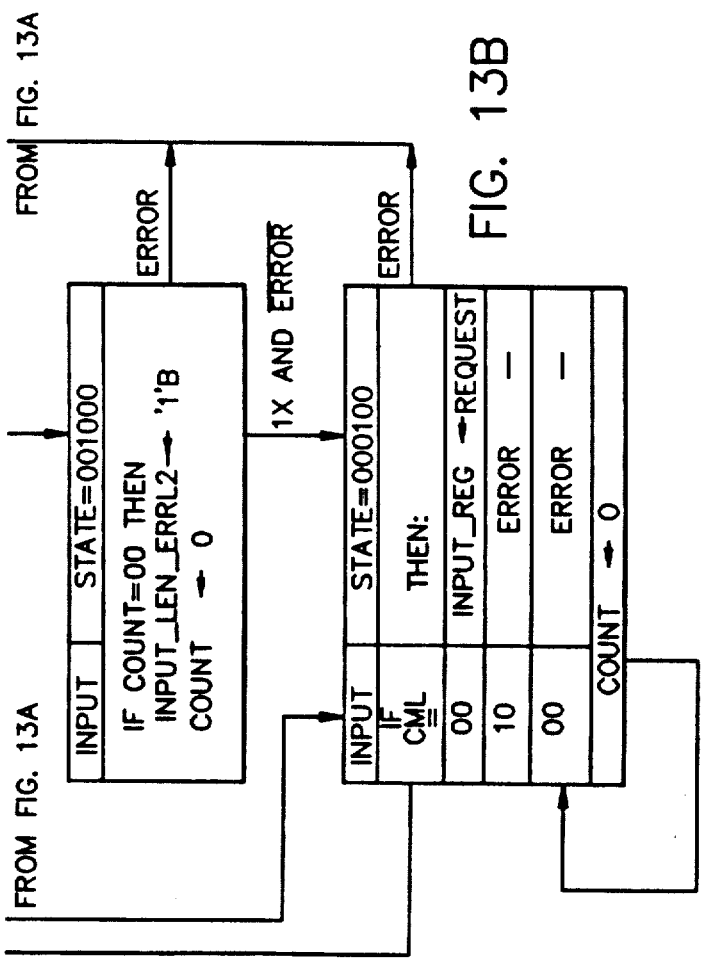
FIG. 13B
```
CLK   01234567   01234567 01234567   01234567 01234567
SYNC  10000000···10000000 10000000···10000000 10000000
ACCEPT 00000000···00000000 00111111 XXXXXXX···XXXXXXX 01111111 00000000
STATE └──IDLE──┘└──SDM──┘└──DM──┘└──RDM──┘└──IDLE──┘
```
FIG. 14

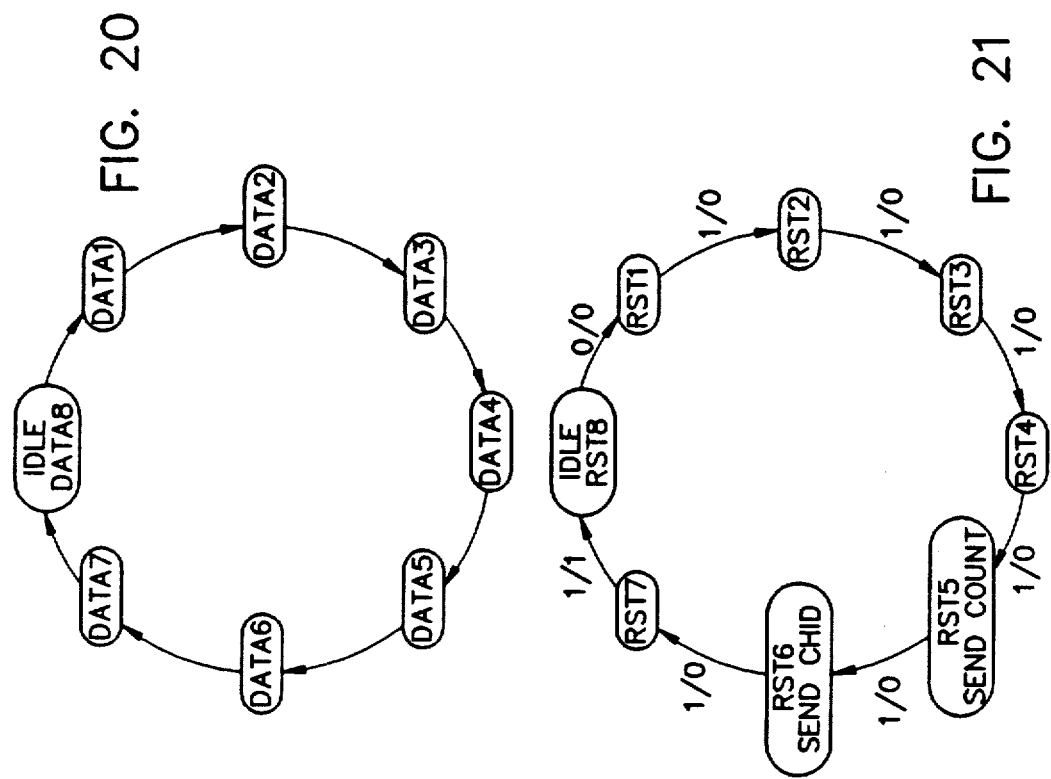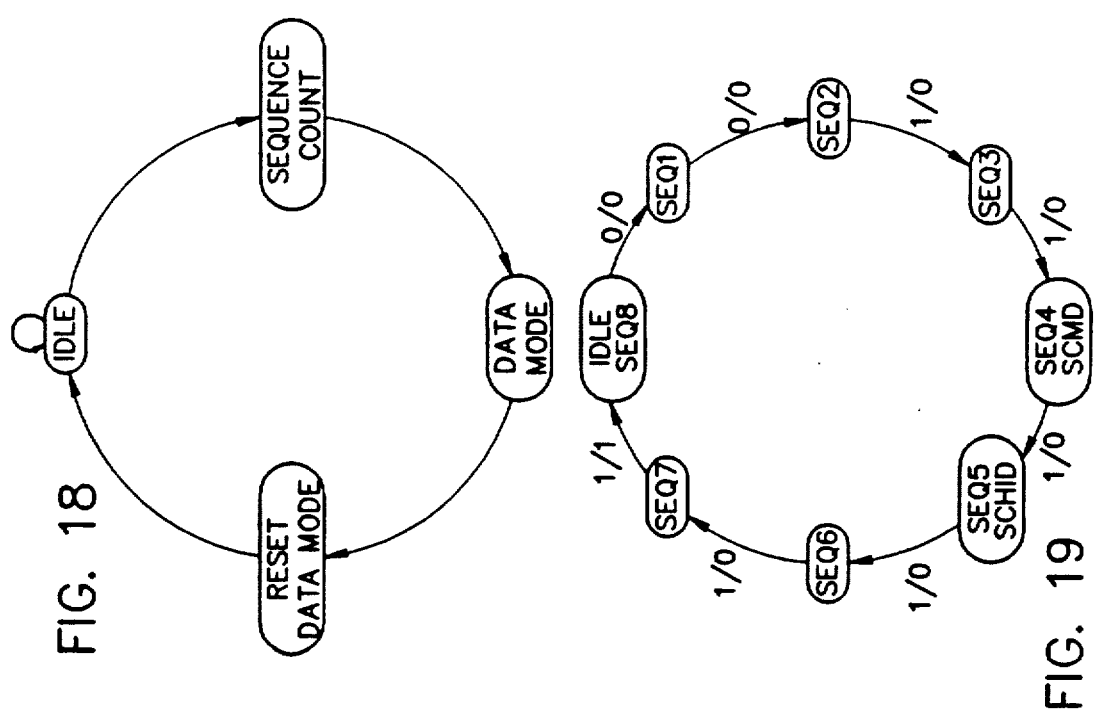

5,097,410

MULTIMODE DATA SYSTEM FOR TRANSFERRING CONTROL AND DATA INFORMATION IN AN I/O SUBSYSTEM

BACKGROUND OF THE INVENTION

This invention is in the field of data exchange between the main storage of a computer and a plurality of off-line input and output (I/O) devices More particularly, the invention is in the field of transferring such information through a computer I/O system in which a plurality of I/O devices are connected to a computer through one of a plurality of interface adapters (IFAs).

In the field of distributed I/O control and data exchange, it is known to connect a plurality of interface adapters to the CPU and main storage of a computer. Each interface adapter is connected to one or more I/O devices to provide access to the main storage. Conventionally, these units compete with each other in offering interrupts to the instruction processing unit of the CPU for the purpose of servicing software-level I/O commands. In particular, the IBM System/370 XA, Model 4381 employs IFA-initiated "traps" (high speed internal interrupts generated by an I/O channel) to "steal" processing time on the instruction processing unit in order to conduct an I/O process.

Recent advances in I/O system technology have resulted in realization of microprogrammed I/O processors which are separate and distinct from the CPU of the computer. These processors provide an I/O system with the power to conduct I/O processing in parallel with CPU operations. Such processors are denoted as shared channel processors (SHCP). An SHCP's microprogram enables it to concurrently execute a plurality of I/O procedures by employing multiprocessing. Further, the multiprocessing ability of an SHCP requires the provision of a plurality of I/O channel resources to support I/O multiprocessing. As a result an SHCP is connected to a plurality of IFA's in order to concurrently conduct more than one I/O process.

Each IFA, in turn, controls the operations of two pairs of I/O channels, and can support up to four concurrent I/O data transfers, each conducted in one of the channels.

Further, each I/O channel buffers data to or from the computer main storage through a channel data buffer (CDB). The channel either places data in its CDB, after which the main storage obtains it, or transfers data out of the CDB after placement therein by main storage for forwarding to an I/O device.

In the usual configuration of an I/O system, the SHCP and CDBs are connected to IFAs through cables or wire connections. As the number of IFAs grows, the physical cable interfaces also increase in size.

It would be desirable to provide for transfer of data through such an I/O system at a maximum rate with a minimum number of interface lines. The minimization of interface lines is desirable in order to maximize the provision of scarce computer hardware space and reduce I/O pin count. With the provision of four channels in one IFA, and the direct connection of each channel to its own CDB, it should be appreciated that the reduction of the control exchange interface between the IFA and its SHCP is an urgent necessity. Moreover, since each SHCP serves more than one IFA, a physically large SHCP to IFA control interface will limit the number of IFA's that can be serviced by an SHCP.

Further, provision must be made for low-level control of data transfer between each CDB and its associated channel, if only to establish the direction of data transfer and to validate the transfer of data. Manifestly, the proliferation of this control interface will also limit the size of the data transfer interface and, relatedly, reduce the rate at which data can be transferred across it.

SUMMARY OF THE INVENTION

The invention is founded on the critical realization that the size of the control interface between a channel processor and each of its associated IFA's can be minimized through the provision of a bi-directional data bus with associated control mode signal paths which can conduct control mode signals to establish a direction and a mode of control signal transfer on the bus. According to the mode, then, I/O process control signals can be transferred in one direction or another and classified by the current mode. Correspondingly, control over the data interface between a channel and its CDB can be efficiently maintained by the provision of a bi-directional data transfer bus between these elements and by a parallel control signal path which conducts signals to establish a mode and direction of data transfer on the bus.

The invention is practiced in a computer input/output (I/O) system for transferring data between a computer main storage and a plurality of I/O devices in response to system I/O commands provided by a computer to the I/O system, the I/O system including a plurality of channel data buffers (CDB's) connected to the main store for buffering I/O data to and from the main store, a translator connected to the instruction unit for translating system I/O commands to I/O process commands and a plurality of I/O interface adapter units (IFA's), each IFA including two pairs of I/O channels, each I/O channel connected to a CDB for exchanging I/O data with the CDB. The invention also concerns a multi-mode I/O control bus system for controlling data transfers between the I/O channels of an IFA and the CDB's connected to the channels. The invention includes a plurality of bi-directional buses, each bi-directional bus connected to a respective one of the IFA's for conducting I/O process commands to the IFA and for conducting channel requests and responses from the channels. A plurality of control mode signal buses is provided, each control mode signal bus connected to a respective one of the IFA's for conducting control mode signals to the IFA, the control mode signals indicating a mode of operation for the respective bi-directional bus also connected to the IFA. A channel interface control (CIC) transfer unit is provided which is responsive to I/O process commands or to channel requests for producing server control signals for each of the IFA's, the server control signals including first server control signals which indicate a first mode of operation in which a bi-directional bus conducts channel requests from the IFA to which it is connected, and second server control signals indicating a second mode of operation in which a bi-directional bus conducts process commands to the IFA to which it is connected or channel responses from the IFA to which it is connected. A plurality of channel servers is provided, each connected to the CIC transfer apparatus and to a respective control mode signal bus for providing first mode signals on the control mode signal bus in response to first control signals or second mode signals upon the control mode signal bus in response to second server control signals. Each server includes a server bus apparatus connected to the bi-directional bus to which the server is connected for providing channel requests to the CIC transfer apparatus in response to first server control signals and for connecting the CIC transfer apparatus to the bi-directional bus in response to second user control signals in order to provide process commands to the bi-directional bus or to receive channel responses from the bi-directional bus. A plurality of IFA control entities are provided, each in a respective IFA and connected to the bi-directional and control mode signal buses connected to the IFA for connecting input request signals from a channel in the IFA to the bi-directional bus in response to first mode signals received on the control mode signal bus or for connecting one of the channels of the IFA to the bi-directional bus to receive process commands or to provide channel responses in response to second mode signals received on the control mode signal bus.

The invention is further practiced in a computer I/O system for transferring data between the computer main store and a plurality of I/O devices, the I/O system including a plurality of channel data buffers (CDBs), each connected to the main store for buffering I/O data to and from the main store, and a plurality of I/O channels, each connected to a respective CDB for exchanging I/O data with the CDB. The invention is a multimode data transfer bus system, including, connected between each I/O channel and a respective CDB, a bi-directional data transfer bus connected to the I/O channel and the CDB for conducting data transfer mode commands to the CDB during a first transfer mode and for conducting data between the CDB and I/O channels during a second transfer mode. A control signal path is connected to the I/O channel and to the CDB for conducting control signals from the I/O channel to the CDB, a first control signal including a periodic synchronizing signal and a second control signal including a transfer mode signal. In the invention, a control signal apparatus is provided in the I/O channel and connected to the control signal path for providing the first and second control signals with a time relationship signifying the first or second data transfer mode. A channel bus apparatus is provided in the I/O channel and connected to the control signal means and to the bi-directional transfer bus for connecting command signals to the bi-directional data bus during the first transfer mode or data signals to or from the bus during the second transfer mode. A buffer mode means is located in the CDB and is connected to the control signal path for providing a first signal representative of the first transfer period or a second signal representative of the second transfer period in response to the time relationship between the first and second control signals. A buffer transfer element is connected to the buffer mode apparatus and to the bi-directional data transfer bus for receiving data transfer mode commands during the first transfer mode and for transferring data from the CDB to the bi-directional data transfer bus, or transferring data from the bi-directional data transfer bus to the CDB during the second transfer mode.

A principal object of this invention is to reduce the physical control interface in an I/O subsystem in order to maximize the physical data transfer interface in the subsystem.

This object and other distinct advantages of the invention will become evident when the following description is read in conjunction with the below-described drawings.

BRIEF DESCRIPTION OF THE DRAWINGS

FIG. 10 is a block diagram illustrating an arrangement of driver circuitry for placing information including an input request on the control data bus of FIG. 1.

FIG. 11 is a truth table illustrating control of the drive circuit of FIG. 10

FIG. 12 is a truth table illustrating state transition sequence errors in the operation of FIG. 9.

FIGS. 13A and B comprise a state transition diagram illustrating operation of the circuitry of FIG. 9.

FIG. 14 is a timing relation diagram illustrating a two-signal protocol for transferring data on the data transfer bus of FIG. 1.

FIG. 15 is a state transition diagram illustrating the operational states of the data transfer bus of FIG. 1.

FIGS. 18-21 are state transition diagrams illustrating the operation of the circuitry of FIG. 16.

DETAILED DESCRIPTION OF THE PREFERRED EMBODIMENT

Figure 1:
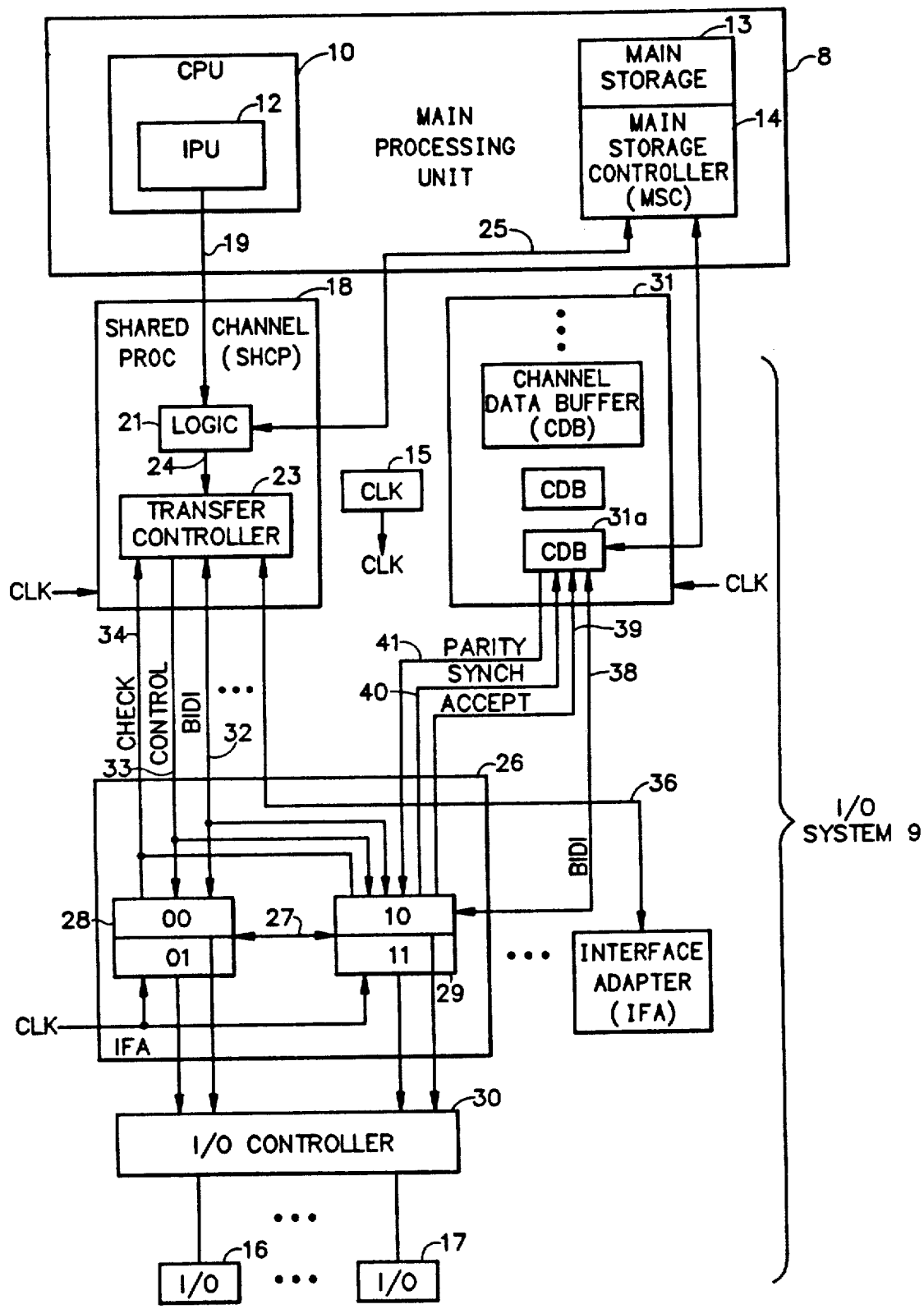
FIG. 1 is a block diagram illustrating the general layout of the invention and its operational environment.

With reference to FIG. 1, there is illustrated a computer system with a main processing unit 8 including a CPU 10, an I/O system 9, and an instruction processing unit (IPU) 12 which receives and processes for execution a string of instructions. These instructions include system level I/O instructions for transferring data into and out of a main storage 13 used by the CPU. Conventionally, access to the storage is obtained by way of a main storage controller (MSC) 14. When a system-level I/O instruction is issued calling for information exchange between the main storage 13 and an I/O device, the IPU 12 has the main storage address of the I/O instruction. In FIG. 1, the responsibility for executing the I/O instruction is passed to an I/O System 9, which includes a shared channel processor 18. In this regard, the SHCP is notified of an I/O instruction by provision of an appropriate signal on signal line 19.

THE I/O SYSTEM

The I/O System 9 includes the shared channel processor 18 to which system I/O commands are offloaded for processing. The SHCP 18 is connected to a plurality of IFA's, one of which is indicated by 26. The IFA's include two pairs of channels each; an I/O data transfer is conducted between an I/O device, such as 16 or 17, and main storage 13 through a channel. Each channel is controlled by the SHCP 18, and transfers data by way of a connected channel data buffer CDB. A common, multiphase clock signal CLK is provided to the major I/O system components from a clock source (CLK) 15 in the I/O system 9.

The SHCP 18 contains conventional logic, in the form of for example, hardware and microcode, which responds to an interrupt on signal line 19 by obtaining and undertaking execution of the command. The interrupt includes the main storage address location of the command which is used by the logic 21 to obtain the command from main storage 13. The logic 21 translates the I/O instruction into an I/O process command which is passed to a CIC transfer controller 23 on the signal line 24. The process command is referred to hereinafter as an "output command" meaning that it represents a command output to a channel to undertake an operation required to initiate or advance execution of a system-level I/O command.

I/O channels are included in a plurality of interface adapters (IFA), one of which is indicated by reference numeral 26. The IFA 26 is representative of all IFA's connected to SHCP 18. The IFA 26 includes two identical pairs of channels, 28 and 29; the channels in the pair 28 are indicated by digital codes "00" and "01", while the channels of the pair 29 are indicated by digital codes "10" and "11." The channel pairs pass error information between themselves on signal line 27. The IFA 26, in turn, is connected to exchange I/O information with I/O devices 16 and 17 by way of an I/O controller 30. The actual transfer of data between the main storage 13 and one of the I/O devices, through a channel in the IFA 26, is by way of a channel data buffer (CDB), such as the CDB 31. It is understood that each channel in each IFA of FIG. 1 is connected to a respective CDB, although only one such connection is illustrated in FIG. 1. In FIG. 1, the CDB 31a is shown connected to the channel "10" of the channel pair 29.

To understand how an I/O process is conducted by way of the structure thus far described, consider the issue of a system-level I/O instruction by the IPU 12. The instruction is issued, and a signal is sent to the logic 21. The logic 21 receives and translates the system level command into the form of an output command passed on signal line 24 to the CIC transfer controller 23. Control signals, including an indication of the I/O process to be conducted, are provided by the controller 23 through a control interface with an IFA, such as the IFA 26. In response to control signals output by the controller 23, one of the channels of the IFA 26 (or one of the channels in one of the other IFA's attached to the SHCP 18) responds to the command output by the controller 23 by undertaking the indicated process. This process may include responding to a poll of availability, selecting an I/O device by translating and forwarding controls to set the device up for a data transfer, transferring data to or transferring data from an I/O device, or transferring data to or receiving data from a CDB. Control information in the form of input requests and command responses flows in the opposite direction, that is, from an IFA such as 26 to the SHCP 18 so that the SHCP can undertake the next step of I/O process, if required. Data flow during I/O processing is in one of two directions between an I/O device and the main storage 13. For example, I/O information transfer may be along the path I/O 16, controller 30, channel "10", CDB 31, MSC 14, and main storage 13.

The invention can now be understood as consisting of an effective, physically minimal control data interface for conducting I/O process control, response, and request information between an IFA such as the IFA 26 and the transfer controller 23, and as a high-capacity I/O data transfer path between a channel and a CDB, such as the channel "10" and the CDB 31a.

The control interface between the SHCP 18 and IFA 26 includes three principal signal paths. The first signal path is a byte-wide, bi-directional data bus (BIDI) 32 consisting of eight bi-directional data lines and one parity line. The second signal interface is a control mode bus (CONTROL) 33 which conducts control mode signals from the SHCP to the IFA 26 on two signal lines, with a third line to provide parity. Last, a two-line machine check signal path 34 conducts a pair of machine check signals from the IFA 26 to the SHCP 18.

The data transfer interface is described with reference to the channel "10" and the CDB 31a, it being understood that an identical interface exists between each of the remaining CDB's in the buffer 31 and the other three channels in the IFA 26. The data transfer interface includes a bi-directional data transfer bus 38 with eight lines for byte-wide data transfer and one line for parity. Two uni-directional lines 39 and 40 respectively conduct an ACCEPT and a SYNC signal from the IFA to the CDB 31a. Last, a single interface 41 conducts a single parity check bit from the CDB 31a to the IFA 26.

Figure 2:
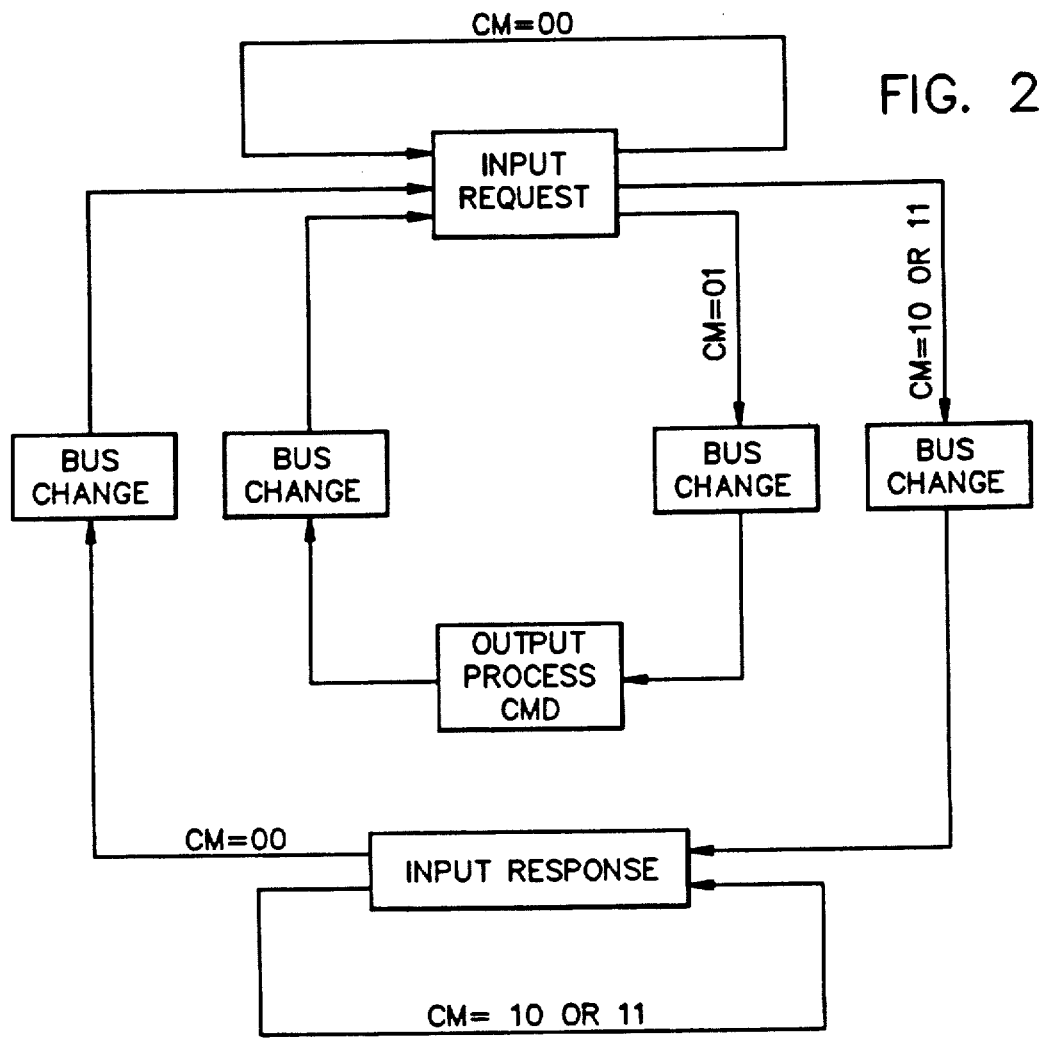
FIG. 2 is a state diagram illustrating an operational state sequence for a bi-directional bus used to transfer control signals according to the invention.

Considering now the control interface consisting of the signal paths 32, 33, and 34 of FIG. 1, refer to FIG. 2, which is a state diagram illustrating a sequence for controlling the transfer of control data between the SHCP 18 and IFA 26 during the execution of I/O processes. The control interface is initially in an INPUT REQUEST (idle) state signified by provision of a control mode code (CM) of 00 on the control mode bus 33. During this mode of signal transfer, the IFA 26 is free to provide an input request to the SHCP by way of the bi-directional bus 32. When the CIC transfer controller 23 changes the control mode signal to 01, the bus connections of the controller 23 and IFA 26 are changed to provide conductivity from the controller 23 to the IFA 26. The bus change requires altering the connections of the controller 23 and the IFA to the bi-directional bus 32 in such a manner as to provide conductivity from the controller 23 to the IFA. This permits output commands to be transferred to the IFA 26. Once an output command is provided to the IFA 26, the controller 23 again changes the control mode code to 00, in response to which the controller and IFA will once again change conductivity to permit conduction of input requests from the IFA to the controller 23. In the outer loop, while the control mode is 00, receipt of an input request may signify that the IFA is prepared to provide to the SHCP 18 either an input command or a response to a previous output command. In this case, the input request will be specific to one of the two channel pairs on the IFA. In response, the CIC transfer controller 23 will change the control mode to 11 or 10, with the second bit signifying the channel pair for which the input request was made. A bus change is required to permit the IFA to connect the identified channel to the bi-directional bus. In mode 10 or 11, a response or command is conducted from the IFA to SHCP 18 on the bi-directional data bus 32, following which the CIC transfer controller 23 changes the control mode to 00, and returning the bus mode to the input request mode.

Figure 3:
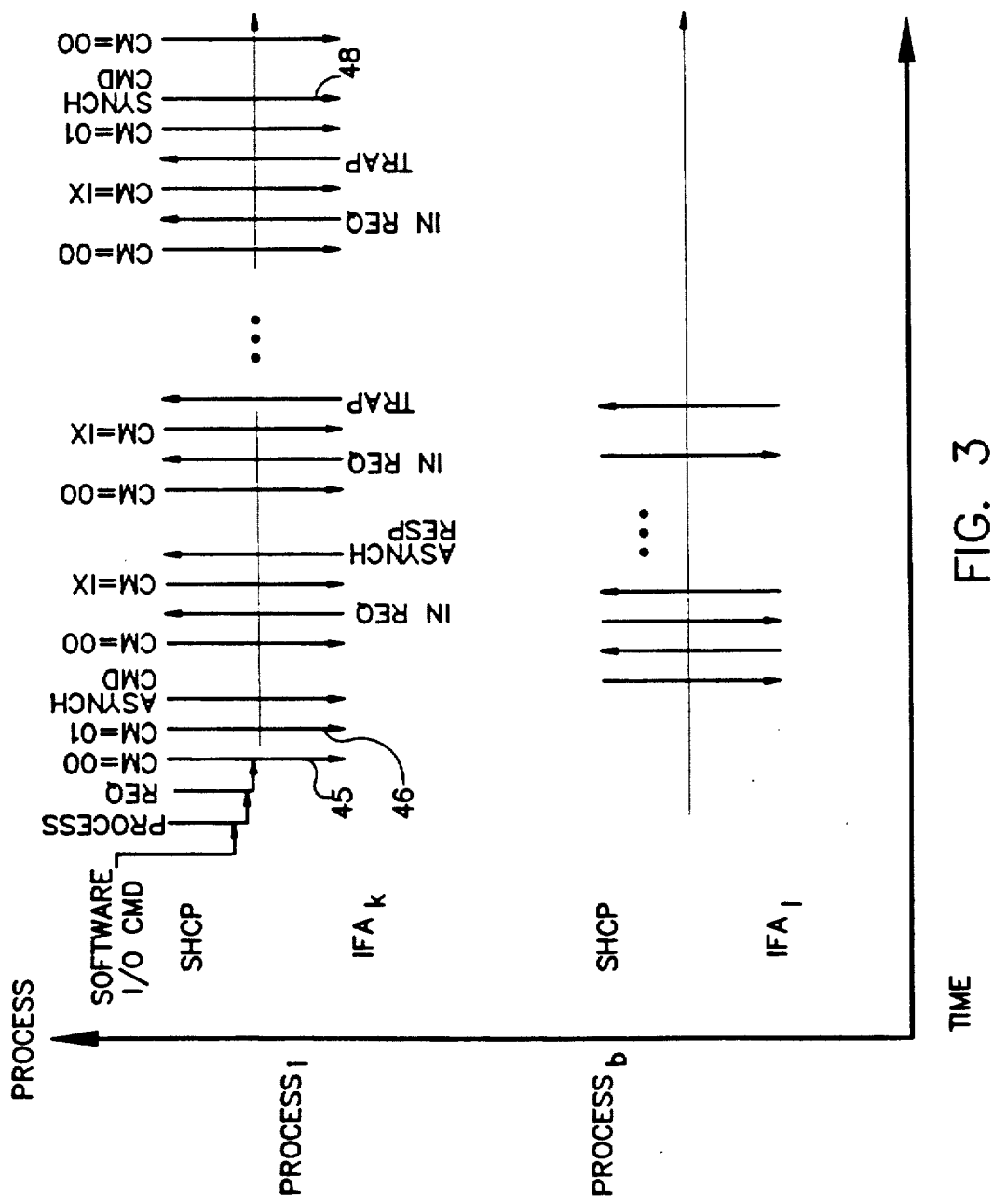
FIG. 3 illustrates interleaved I/O multiprocessing conducted by a channeled interface control (CIC) unit illustrated in FIG. 1.

Returning to FIG. 1, the logic 21 is a microcoded entity. The hardware and the program of the logic 21, together with the capability of the CIC transfer controller 23, permits the SHCP to concurrently conduct a plurality of separate I/O processes. In this respect, the SHCP 18 is a multi-processor in the conventional sense. The multi-processing capability of the SHCP 18 permits it to conduct two or more processes, say, for example, process i and process b through respective channels, which may be on the same IFA, or separated. Concurrently-executing processes i and b are illustrated in FIG. 3, with process i shown in detail. In FIG. 3, the horizontal axis represents time, while the vertical axis represents a particular I/O process being executed by the SHCP 18. Each process is represented by a horizontal sequence of arrows. Downward pointing arrows signify provision of control information to an IFA from the SHCP. Upward pointing arrows represent input requests or traps provided to the SHCP by the IFA. Each process is conducted with respect to a specifically identified channel, implying that an IFA is thereby identified.

Figure 4A:
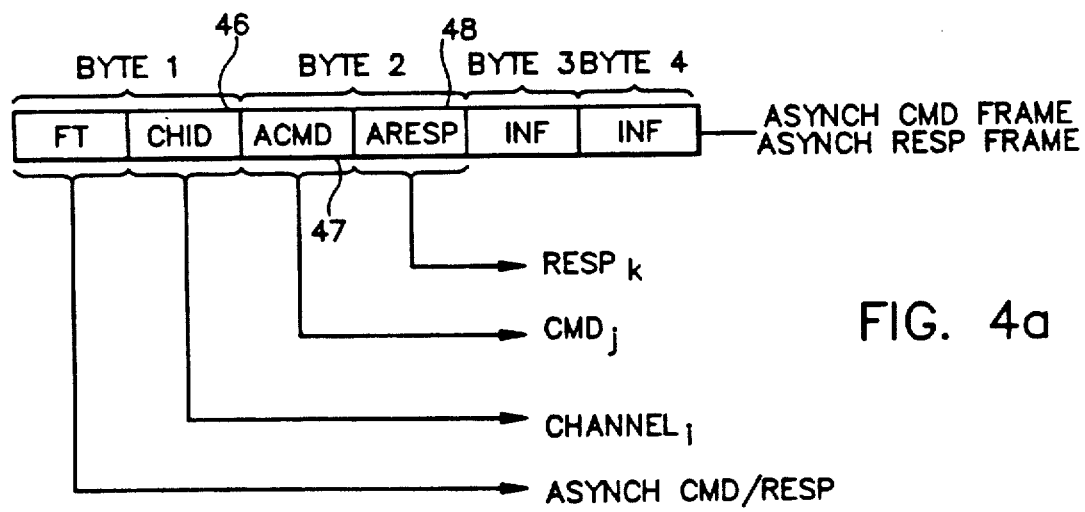
FIG. 4A illustrates the format of an asynchronous command frame.

With respect now to process i, the SHCP receives a software-level I/O command which is retrieved and processed by the logic 21. In processing, the logic 21 selects a specific channel to support execution of the command. In addition to channel selection, the logic 21 processes the command into a format which is recognized and executed by the IFA's. The first command initiating a process in response to a software I/O command is an output command, termed an "asynchronous" (ASYNC) command. Asynchronous commands (and asynchronous responses) have the format illustrated in FIG. 4A. Asynchronous commands are four byte frames. The first byte includes a frame-type (FT) identification field 45 and CHID field 46 identifying the selected channel. A code in the FT field identifies the frame as either an asynchronous command or an asynchronous response frame. If an asynchronous command frame, the first field 47 of the second byte of the frame contains a code corresponding to the command (ACMD). This can be any one command ($CMD_j$) of a set of commands. If the frame is an asynchronous response frame, the second field 48 contains a code identifying the type of response. The third and fourth bytes of the asynchronous command frame permit transmission of information respecting execution of the command. Returning to FIG. 3, when the asynchronous command frame has been assembled by the process logic 21, the logic 21 passes an output request to the CIC transfer controller 23.

Figure 4B:
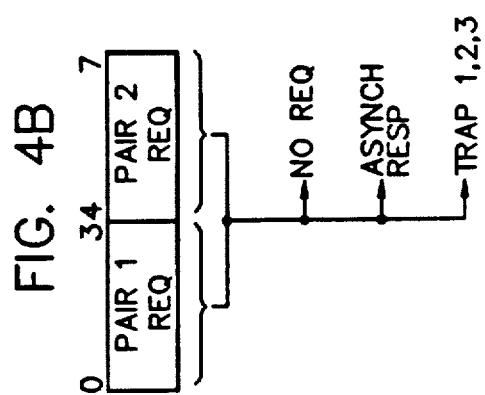
FIG. 4B illustrates the format of an input request

When the CIC transfer controller 23 receives an output request, it changes the control mode for the IFA where the identified channel is located from 00 to 01. Following the change of mode, the transfer controller 23 sends the asynchronous command to the IFA, and then changes the control mode to 00. $IFA_k$ receives and decodes the asynchronous command and prepares an asynchronous response, which is to be transferred to the SHCP in the frame format of FIG. 4A. In this case, the second field of byte 2 is encoded with the code for a response ($RESP_k$) which appropriately replies to the previously received asynchronous command. When the asynchronous response is prepared for transmission, the $IFA_k$ transmits an input request having the form of FIG. 4B on the bi-directional data bus 32 to the SHCP 18. The input request is a single byte in which a first 4-bit field is encoded with a request from one channel pair in the IFA, and the second field contains a request from the second pair. The IFA encodes the pair field corresponding to the channel identified in the previously-received command. The request can indicate that no request is being made, or that an appropriate response (ASYNC RESP) has been prepared to the previously-transmitted asynchronous command. In this case, the ASYNC RESP would be encoded into the appropriate pair field and the input request placed on the bi-directional bus 32. When the input request is received, the transfer controller 23 changes the control mode code to 1X, with the X bit set according to the identified channel pair. When the IFA control $IFA_k$ senses the 1X control mode, it places the asynchronous response on the bi-directional bus 32. Upon receipt of the response, the transfer controller 23 again changes the mode control code to 00. Assuming the process is not terminated, when the code returns to the input request state the asynchronous response is followed by either an input request or an output command, as appropriate for continuing the process.

As FIG. 3 illustrates, the multi-processing capability of the SHCP enables it to conduct process i with the $IFA_k$ while concurrently conducting process b with the $IFA_l$. In the preferred embodiment, 1 can equal, or not equal, k.

Figure 4C:
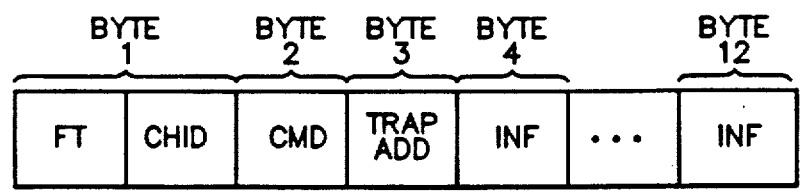
FIG. 4C illustrates the frame format of a synchronous command and a trap.

The control information exchange over the control interface of this invention is not constrained to an asynchronous command/asynchronous response sequence. For example, in FIG. 3, the SHCP, after initiating an I/O process by means of an asynchronous command and receiving an asynchronous response, sends a synchronous command (SYNC CMD). In response the $IFA_k$ sends to the SHCP a trap frame. Both the synchronous command and the trap frames are multi-byte frames having the format illustrated in FIG. 4C. The illustrated format preferrably includes four, eight, or twelve bytes. The first byte includes FT and CHID fields corresponding to those of FIG. 4A. The second byte contains a code indicating a command ($CMD_j$), while the third byte contains a code denoted as "trap address". The command byte contains a code indicating a command to be executed by an IFA if the frame is a synchronous output command; alternatively, this byte indicates the last command received by the IFA if this frame is a trap frame which responds to a previous synchronous command. A trap frame may also be transmitted as the result of a request received by the IFA from an I/O device. In this case, the command field is coded to indicate the next command which the IFA will execute in response to the I/O device request. The trap address field is an address in the microcode of the I/O process logic 21 of the SHCP. This address initiates a microcode procedure which is appropriate to respond to the IFA condition which stimulated production and transfer of the trap frame. Thus, the interrupt signified by a trap results in a suspension of microcode executing in the logic 21, while the routine at the trap address is executed. Information bytes of the frame type illustrated in FIG. 4C contain information that is to be passed with the frame. The number of bytes is dependent upon the frame type identified in the first field of byte 1.

Figure 5:
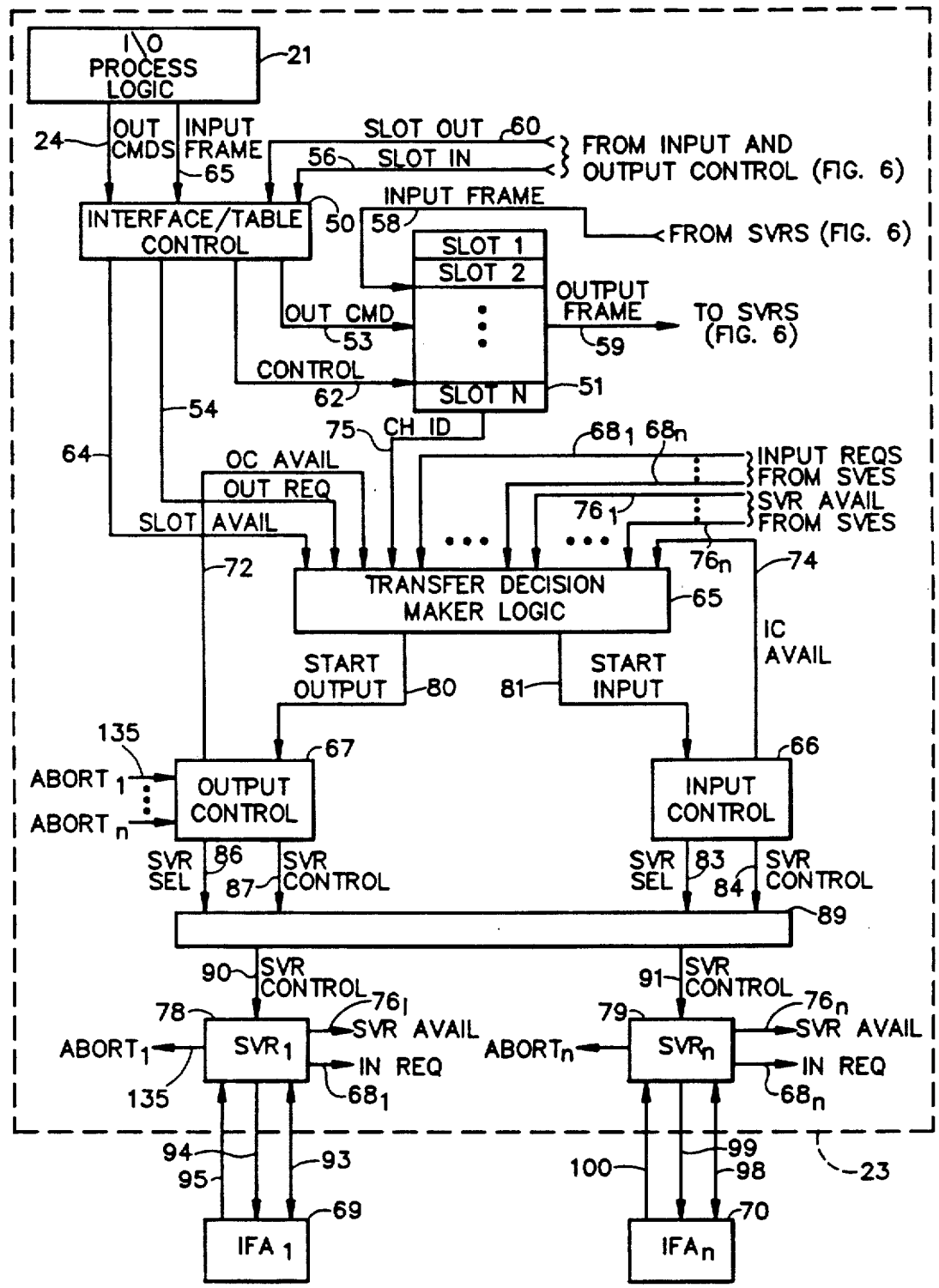
FIG. 5 is a more detailed block diagram of the CIC transfer controller illustrated in FIG. 1 showing the flow of control signals.

FIG. 5 illustrates in greater detail the CIC transfer controller 23 of FIG. 1, and is presented to explain in detail how the SHCP provides the control more signals and how data is exchanged between the SHCP and the bi-directional bus 32. The CIC transfer controller 23 is connected to the I/O process logic 21 by way of interface/table control circuit 50, comprising conventional digital logic, and a process table 51. The process table 51 is a conventional storage array which is read and written to by the interface/table control circuit 50. The process table 51 is organized into M slots. With the exception of slot 1, each slot comprises a 12-byte wide addressable storage location for containing a synchronous command to be sent to an IFA or a trap or command received from an IFA. Slot 1 is subdivided into two 4-byte subslots, the first of which is for containing an asynchronous command to be sent to an IFA, and the second of which is to receive an asynchronous response from an IFA. An output command, either asynchronous or synchronous, is received from logic 21 on signal path 24 by the control circuit 50. The control circuit 50 monitors the available slots in the process table 51. When a command is received from the logic 21, the control 50 places it either in the first 4 bytes of slot 1 if it is an asynchronous command. In the command protocol of the preferred embodiment, a synchronous output command is provided only in response to an input command in the process table. The output command is assembled in the process table 51 by modification of the input command. Thus the synchronous output command will occupy the slot of input command which stimulates it. Assembly, or entry, of an output command frame in the table 51 is represented by the signal line 53. When a command is assembled or placed in the table 51, the control circuit 50 provides an output request on line 54, signifying presence of the output command in the process table, and identifying the slot where the command is located. On signal line 56, the control circuit 50 receives signals indicating that a response frame from an IFA has been placed in the table 51 (SLOT IN), the signal also indicating which slot the IFA frame has been placed in; the frame is placed in the identified slot by way of signal line 58. Each output frame is conducted from the table 51 on the signal line 59 from a slot indicated by a signal SLOT OUT on line 60. The appropriate control signals including read, write, and address for reading and writing frames to and from the table 51 are provided by the control circuit 50 on signal line 62.

In addition to controlling the entry and extraction of frames into and out of the process table 51, the control logic 50 also keeps track of which slots are available. With this knowledge of availability, the control logic signifies a slot available (SLOT AVAIL) on line 62, identifying the slot as being available for receiving an input frame. In addition, when an input frame is entered into the process table 51, the control circuit 50 provides a signal (INPUT FRAME) on signal line 63 to the process logic 21, alerting the logic to the receipt of an input frame. The input frame signal identifies the slot in which the frame is available. The process logic 21 is thereby enabled to identify and process the input frame in the table 51 by way of the control circuit 50. Extraction of an output frame from the process table 51 places the empty slot into the collection of slots available.

A transfer decision maker logic 65 operates in response to an output request on signal line 54 by initiating a process for transferring an output frame from an identified slot in the process table 51 to the IFA containing the channel identified in the first byte of the frame. This process is conducted by a state machine labled in FIG. 5 as the output control 67. Similarly, the transfer decision maker logic 65 responds to input requests on signal lines $68_1$ through $68_n$, each representing an input request from a channel on one of m IFA s, respectively. For example, an input request on signal line $68_1$ is one which has been provided by $IFA_1$, indicated by reference numeral 69 in FIG. 5. In response to an input request, the transfer decision maker logic 65 initiates an input process conducted by an input control state machine 66. The process operates to transfer an input frame from the bi-directional bus serving the requesting IFA into the process table 51.

The transfer decision maker logic receives the SLOT AVAIL signal on signal line 64, the output request signal on signal line 54, and the input request on signal line $68_1$-$68_m$. In addition, the transfer decision logic 65 receives a signal OC AVAIL on signal line 72, when the output control state machine 67 is unoccupied, and a signal IC AVAIL on signal line 74 when the input control state machine 66 is idle. The transfer decision maker logic 65 also receives on signal line 75, the channel ID field of the output frame indicated by the output request signal on signal line 54. Last, signal lines $76_1$-$76_n$ conduct server available signals (SVR AVAIL) to the logic 65. Each SVR AVAIL signal is produced by a respective one of n servers ($SVR_1$-$SVR_n$) The first and last of these servers are indicated by reference numerals 78 and 79, respectively. The transfer decision maker logic 65 produces a START OUTPUT signal on signal line 80 which is connected to the output control state machine 67. The output control state machine also is connected by a respective ABORT signal line to each one of the n servers. A START INPUT signal is provided on signal line 81 by the transfer decision maker logic as an input to the input control state machine 66. Each of the state machines 66 and 67 provides a set of signals, SVR SEL and SVR CONTROL. These signals are provided on signal lines 83 and 84, respectively, by the state machine 66 and on signal lines 86 and 87, respectively, by state machine 67. In the case of each of the state machines 66 and 67, the SVR SEL signals indicate one of the n servers to which the machine is to be connected. A cross connect circuit 89 serves to connect the state machine with the one of the n servers indicated by a SVR SEL signal. Cross connect circuit 89 provides to the server indicated by the SVR SEL signal of the state machine, the SVR CONTROL signals output by that machine. Thus, if the server 78 is selected by the input control state machine 66, the cross connect circuit 89 will conduct SVR CONTROL signals from signal line 84 to signal line 90, by which signals will be input to the server 78.

Each of the n servers is connected to a respective one of n IFA's by a control interface identical to that described above in connection with FIG. 1. Thus IFA$_1$ indicated by reference numeral 69 is connected to the server 78 (SVR$_1$) by a bi-directional data bus 93, a control mode bus 94, and a check signal interface 95. Similarly, the server 79 (SVR$_n$) is connected to the IFA 70 (IFA$_n$) by a bi-directional data bus 98, a control mode bus 99, and a check signal interface 100.

In operation, the transfer decision logic 65 receives an output request from signal line 54 signifying that an output frame has been placed in an identified slot on the transfer table 51. In response to the output request, the transfer decision maker logic 65 inspects the channel ID field of the identified slot, thereby identifying the IFA on which the channel is located. This identification also provides identification of the server which is connected to the identified IFA. If the server is idle, its SVR AVAIL signal will be set, indicating that the server is available for providing the output frame to its connected IFA. Now, if the output control state machine is also idle, the transfer decision maker logic will generate the START OUTPUT signal on signal line 80. Provided with the START OUTPUT is the identification of the slot where the output frame is stored, together with the identification of the server connected to the IFA for which the output frame is destined. At a BOOLEAN level the start output signal is raised in response to conjunction of output request, the availability of the server required to process the request, and the availability of the output control state machine.

When the output control state machine 67 receives the start output signal from the transfer decision maker logic 65, it generates the server select signal identifying the server connected to the IFA to which the output frame must be transferred, and executes a state sequence resulting in the delivery of a sequence of server control signals to the selected server. In response to the server control signals, the selected server appropriately sets the condition mode signals, establishes a connection to the bi-directional bus which will permit the output frame to be conducted to the bus from the identified slot in the process table, and then appropriately sets the condition mode signals to 00, inviting the IFA to send an input request across the bi-directional bus.

Consider now that the control mode on the control mode bus 94 is 00 and that the IFA sends an input request byte on the bi-directional bus 93, the byte being received by the server 78. Upon receiving the byte, the server 78 decodes the byte and raises its input request line 68$_1$. Upon receiving the input request, the transfer decision maker logic will generate a START INPUT signal, only upon the condition that a slot is available and that the input control state machine 66 is available also. These conditions are indicated on the signal lines 64 and 74. The START INPUT signal is provided on signal line 81, with an indication of the available slot and identification of the server 78 connected to the IFA 69, which raised the input request. In response to the START INPUT signal, the input control state machine 66 executes a state sequence which provides a series of server control signals to the server 78. The server control signals cause the server to, first, appropriately condition control bus 94 to the input frame state, which indicates to the IFA 69 that it should place its response frame on the bi-directional bus 93. Following this, the server will place the control mode signal back into the send request state.

Figure 6:
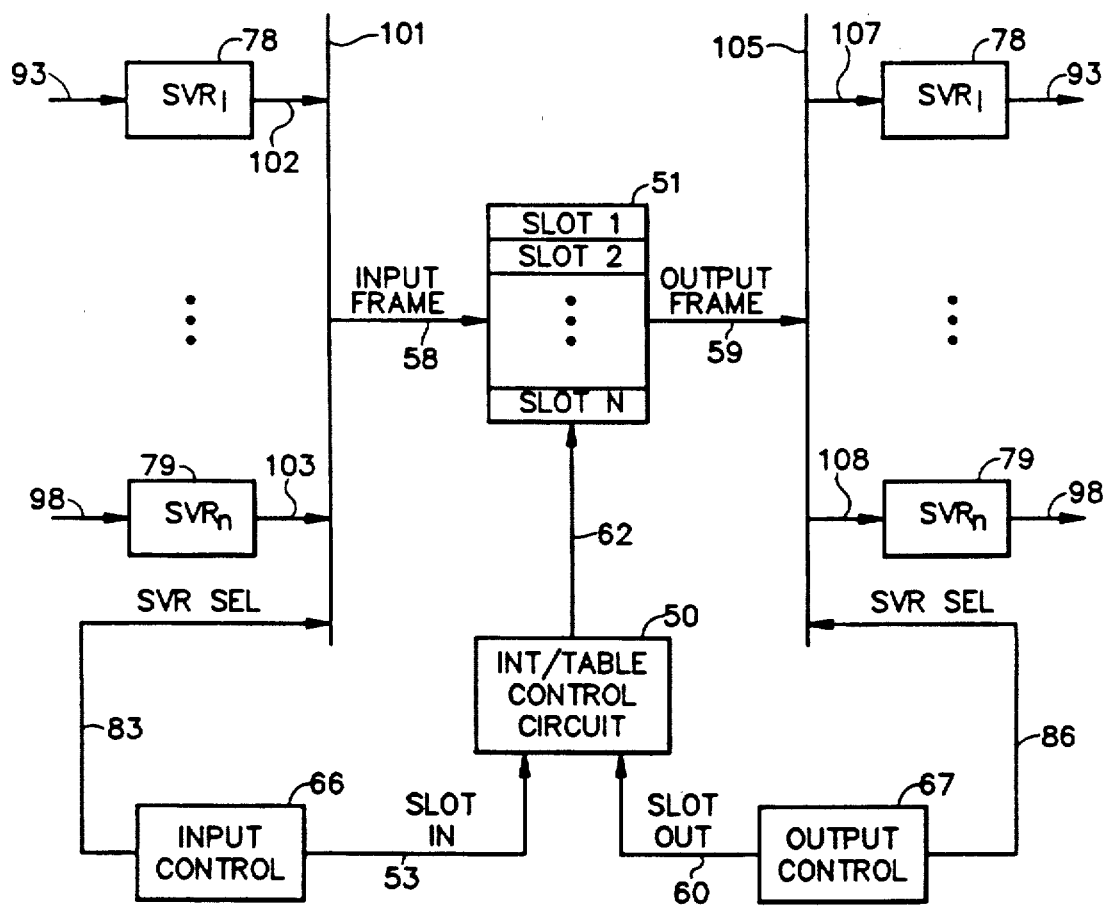
FIG. 6 is a block diagram of a portion of the transfer controller of FIG. 5 showing data flow in the controller.

The data flow for transferring input and output frames to and from the process table 51 is illustrated in FIG. 6. As shown in FIG. 6, servers 78 and 79 are connected to an n-to-1 input multiplexer 101 by output signal lines 102 and 103, respectively. During an input sequence, a signal on the SVR SEL signal line 83 is provided to the multiplexer 101 to appropriately connect the selected server input to the input frame signal line 58. An output frame is transferred to the server indicated by the SVR SEL signal provided on signal line 86, which conditions a 1-to-n multiplexer to connect the output frame on the signal line 59 to the selected server.

Figure 7:
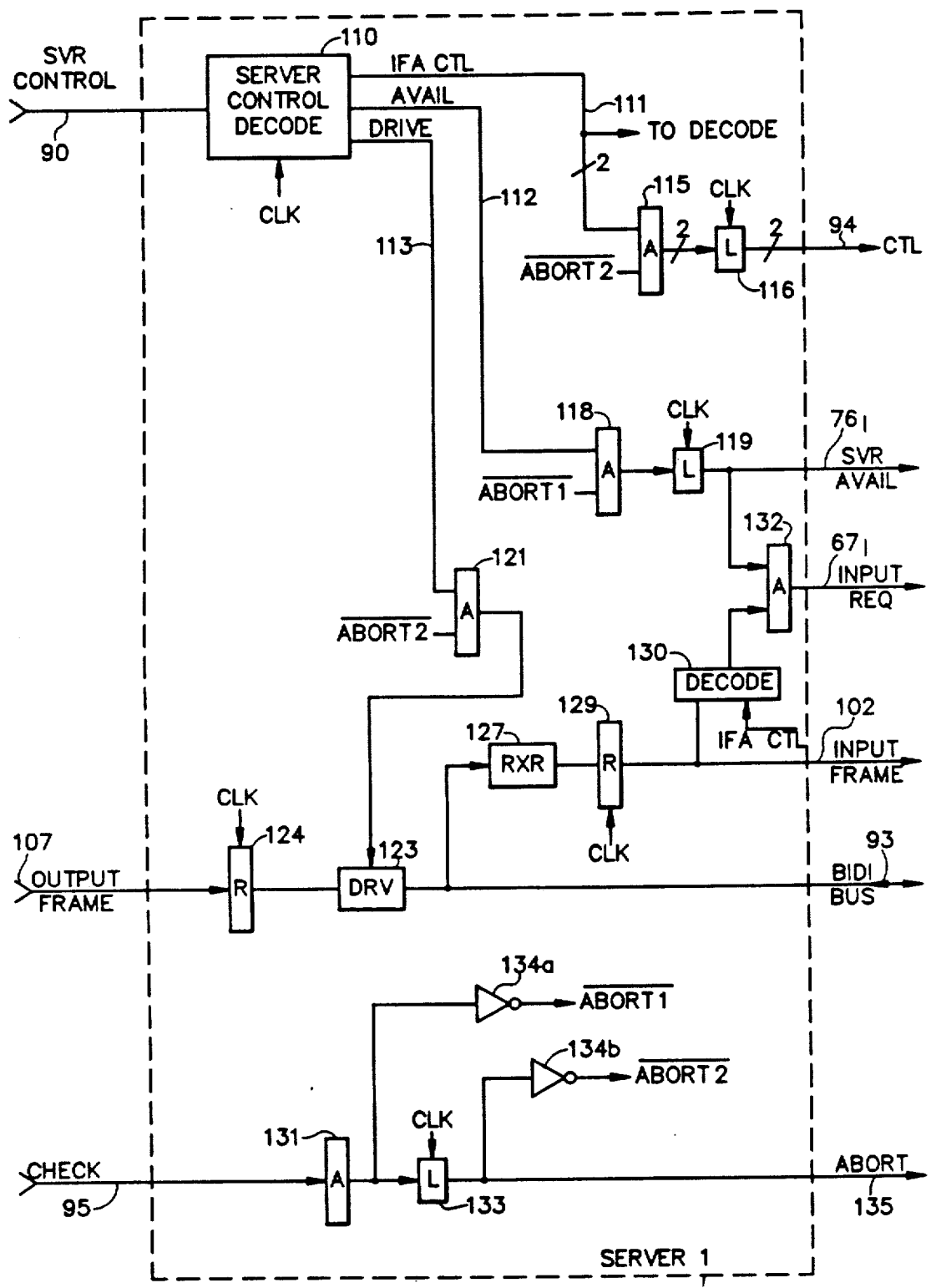
FIG. 7 is a more detailed block diagram of an IFA server illustrated in the controller of FIG. 5.

FIG. 7 illustrates in greater detail one of the n servers of FIG. 5. For convenience, the server is the server 78 of FIG. 5, it being understood that the following explanation also applies to each of the remaining n−1 servers. Server control signals are conducted on signal line 90 to a server control decoder 110 which decodes the server control signals to provide an IFA control signal on line 111, an availability signal on line 112, and a drive signal on line 113. The IFA control signals are gated through an AND circuit 115 by a signal ABORT 2. The gate circuit 115 provides the IFA control signals to a two-bit latch 116, which provides control mode signals on signal line 94. The availability signal on line 112 is fed, with a signal ABORT 1, to an AND gate 118. The output of the gate 118 is captured in the latch 119, which drives SVR AVAIL line 76$_1$. The drive signal is fed to an AND gate 121 and combined there with the ABORT 2 signal. The output of the AND gate 121 is fed to enable the driver 123, which drives the bi-directional bus 93 in response to a positive output from the AND gate 121. The input to the driver is provided on the eight OUTPUT FRAME lines 107 through a byte-wide register 124. The input of receiver 127 is connected to the bi-directional bus 93 commonly with the output of the driver 123. The output of the receiver feeds a register 129 whose output drives the INPUT FRAME line 102. The output of the register 129 is also provided to a decoder 130. The decoder 130 is gated by the IFA CTL signal; when the signal is 00, the decoder receives the contents of the register 129. When the IFA CTL signal is 00, the bidirectional bus 93 is available to conduct input requests from the IFA served by the server 78. When an input request is in the register 129, the decoder 130 raises its output, which is provided to an AND gate 132. The gate 132 combines the output of the decoder 130 with the server available signal, output by the latch 119, resulting in a provision of an input request only when the server available signal is set.

Figures 8A, 8B, 8C:
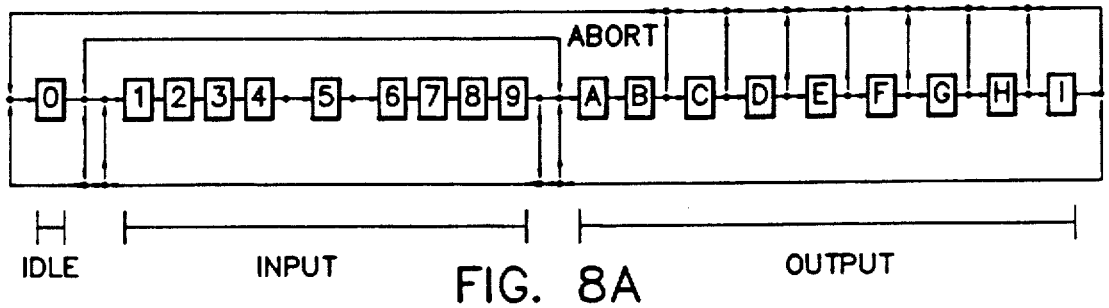
FIG. 8A is a state transition diagram illustrating a sequence of states for inputting and outputting control information on the bi-directional bus of FIG. 1.
FIGS. 8B and 8C are tables illustrating the nature of signals generated during the state sequences of FIG. 8A and used to control the transfer of control information on the bi-directional bus.

The operation of the server of FIG. 7 in the transfer of an input frame and the transfer of an output frame can be understood with reference to FIGS. 8A-8C. FIG. 8A is a state sequence diagram combining an input sequence and an output sequence of the server in response to corresponding state sequences of the input control machine 66 and the output control machine 67, respectively. In more detail, states 1-9 of the input sequence reflect corresponding states in a corresponding sequence of the input control machine 66, while states A-H of the output sequence reflect corresponding states in an output control machine sequence. FIG. 8B associates each of the server control states of FIG. 8A with a value of the server control signal received by the server control decode. FIG. 8C illustrates the output of the server control decoder 110 in response to each of the possible states of the server control signal. In FIGS.

8B and 8C, the server control signal is a four-bit signal, whose values are represented in conventional hexadecimal format (HEX). As explained above, the IFA control signals (IFA-CTL 0 and 1) are the control mode signals placed on the load control bus 94. In FIG. 8C, the designation p is used to indicate identification of a channel pair in the IFA 69 by a least-recently-used algorithm (not shown) in the server control decoder 110. Assume in the following explanation that both ABORT signals are set. Under this condition, the server is in control state 0, which is its idle state. In this circumstance, the server is not connected to a controller and the server control decoder 110 interprets the condition of the server control lines 90 as indicating a server control value of 0. In this case, as shown in FIG. 8C, the IFA control signals are conditioned to 00, the drive signal to 0 and the availability signal to 1. Under these conditions the control mode bus will provide a control mode signal of 00 to the IFA 69, inviting input requests. The server availability signal will be set for this server. The input request AND gate 132 will be conditioned to respond to the output of the decoder 130, while the drive signal will disable the driver 123. Assume now that an input request is received from the bus 93 and registered at 129. Following registration, the input request will be decoded by the decoder 130, causing the AND gate to assert an input request on line $68_1$.

Assume now that the input request has been accepted by the transfer decision maker logic 65, and that a START INPUT signal identifying the server 78 has been provided to the input control machine 66. The machine selects the server and conducts a nine state sequence corresponding to the nine-state input sequence of FIG. 8A. During that nine-state sequence, the machine 66 will provide a sequence of server control signals corresponding to that given in FIG. 8B for the input sequence defined by server control states 1-9. In state 1, the server control signal is decoded as shown in FIG. 8C, causing the availability signal to drop and setting the control mode signal to 1p. Next the progression is from states 2-5 during which the server control sequence maintains the control mode, availability, and drive signals as just described for state 1. Preferably, state transition 3-4-5 sets the input control machine 66 for reiterating state 5 for as many clock cycles as is necessary to transfer the input frame. In this regard, the size of the input frame is signified by the input request code, the code signifying how many bytes will comprise the input frame. However, an understanding of this feature is not necessary to a full description of this invention. After state 5, the input control machine during server control states 6, 7, and 8, provides a server control signal sequence 2-2-2, which changes the control mode signals to 00 as illustrated in FIG. 8C. During this transition, the availability and drive signals are reset, maintaining connection of the receiver 127 to the data bus 93 and suppressing generation of the SVR AVAIL signal on signal line $76_1$. The end of the input sequence is state 9, signified by a server control signal value of 6, which raises SVR AVAIL signal, indicating to the transfer decision maker logic 65 that the server 78 is now and available for transferring an output frame to the IFA 69. It is noted that the transition from state 9 can proceed directly to the idle state, to state A of the output sequence, back to state 1 of the input sequence, or to the idle state 0.

From the standpoint of state A, and with reference to FIGS. 8A and 8B, the server can begin an output sequence either from the idle state 0, from state 9 or from State I. In all of these states, the SVR AVAIL signal is set, indicating the availability of the server to conduct an output frame transfer. Assuming now a transition to state A of the output sequence, the first transition is A-B, during which the server control signal is maintained at a hexadecimal value of 3. Reference to table 8C will teach that the control mode signals are conditioned to 01 for both of these states, following which a transition to state C will set the drive signal, while maintaining the control mode at 01. With the drive signal set, the driver 123 is enabled, while the receiver 127 is disabled, resulting in connection of the output frame to the bi-directional bus 93 on the path 107, 124, 123. As a design choice, the server can be provided with the ability to loop in output state E according to how many bytes are in the output frame. Again, the teaching of this implementation is unnecessary to complete understanding of this invention. After the output frame is placed on the bi-directional bus 93, the server transitions through the sequence G-H-I driven by the server control signal sequence 9-2-6. This server control signal sequence sets the control mode signals on the control mode bus 94 to 00 and sets the availability signal in state I. As FIG. 8A illustrates, server control can transition from state I to either state A, state 1, or state 0.

The check lines 95 are monitored through AND gate 131. When both check signal lines have a digital value of "1", the output of the AND gate rises, resetting the ABORT 1 signal by way of the inverter 1342. One clock period later, the ABORT 2 is deactivated through the inverter 1346 when the output of the AND gate 131 is latched at 133. As shown in FIG. 8A neither abort signal will affect an input sequence, once started. However, an output sequence, once started, will transition from any state to the idle state with the provision of an abort signal. As shown in FIG. 7, the ABORT 1 signal will toggle the SVR AVAIL signal for one clock period by way of AND 118 and clocked latch 119. The ABORT 2 signal will toggle the control lines to 00 for one clock period through the AND gate 115 and the clock latch 116. The ABORT 2 signal will also disable the driver 123 for the one clock period it is held in the clocked latch 113. Of course, if the CHECK lines are continuously activated, the ABORT signals will effectively disable the server 78 for so long as the CHECK lines are active. This will shut off access to the IFA served by the server 78 by keeping the SVR AVAIL signal deactivated.

Figure 9:
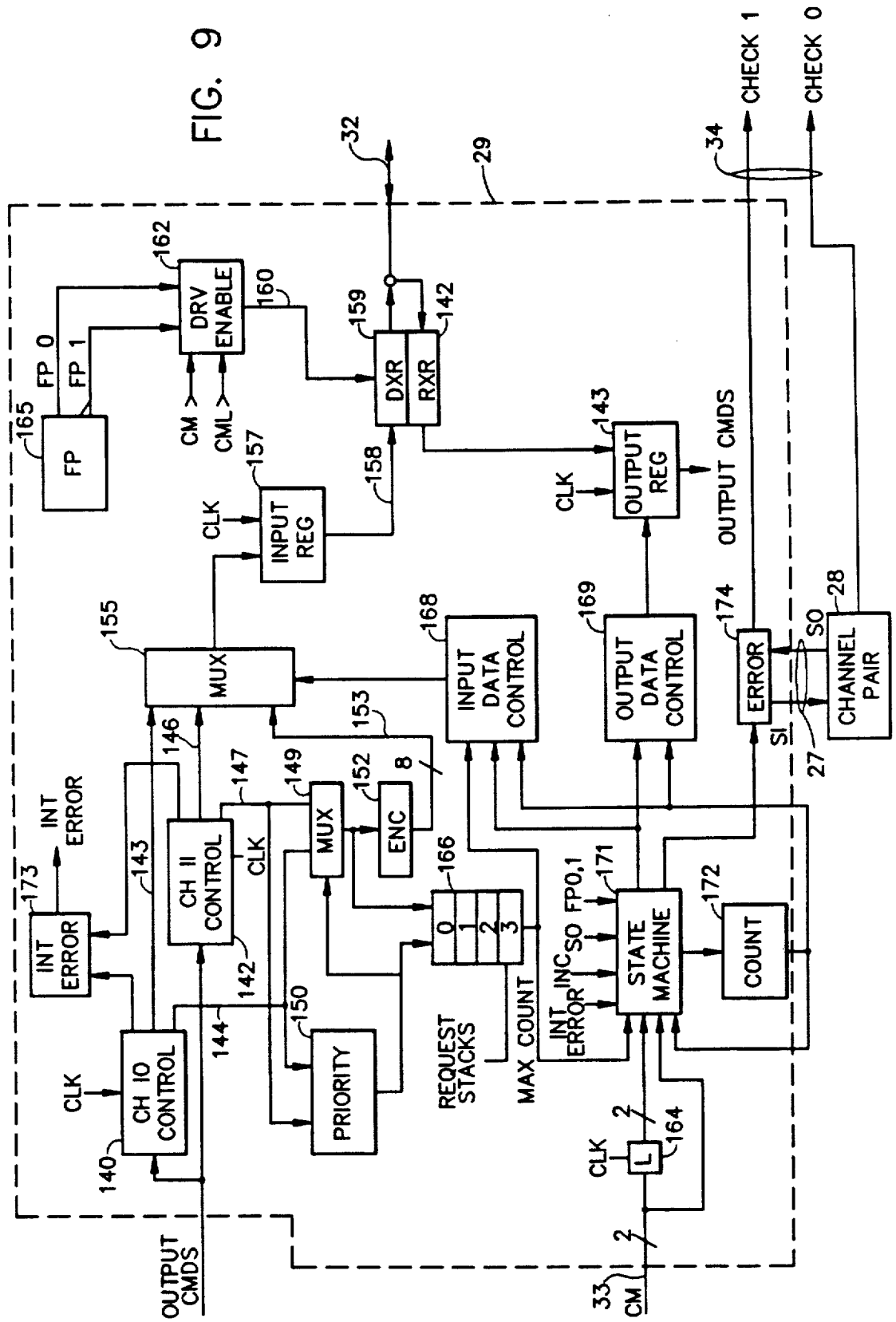
FIG. 9 is a block diagram illustrating bus interface circuitry of a channel pair.

Each IFA includes two channel pairs connected by a common interface to the SHCP. One channel pair is illustrated in FIG. 9 and is indicated, as in FIG. 1, by reference numeral 29. The other channel pair is indicated by reference numeral 28. The channel pair 29 of FIG. 9 includes a pair of channel controllers 140 and 142. The controller 140 is designated as the channel 10 controller, while the controller 142 is the channel 11 controller. Each controller consists of logic required to receive output commands output from the CIC, and to respond appropriately with input requests and traps. The output commands received on the data bus 32 from the CIC are designated as OUTPUT CMDS. The channel 10 controller 140 provides responses on signal line 143 and input request information on signal line 144. The controller 142 provides responses on signal line 146 and input request information on signal line 147. The input request information on signal lines 144 and 147 is input to a multiplexer 149 and to a request priority circuit 150. Request information selected by the multiplexer 149 is input to a request encoder 152, which encodes a 4-bit input request. The 4-bit input request is replicated in two identical 4-bit requests which are provided on 8-bit signal channel 153. Traps and duplicated input requests are fed forward by a multiplexer 155 to a byte-wide input register 157. A trap is streamed through the multiplexer 155 byte-by-byte and driven through the driver 159 onto the bi-directional data bus 32. Only the upper or lower 4 bits of any duplicated 4-bit request will be provided through the driver 159 to the corresponding 4 signal lines of the data bus 32. The driver 159 is enabled by a signal on signal line 160 provided through a driver enable circuit 162. The driver enable circuit responds to the control mode code (CM) on the control mode signal interface 33 and to a control mode latch signal (CML), which is output by a latch 164. The latch 164 is enabled once each period of the CLK signal. Therefore, the CML signal provided by the latch 164 represents the control mode code delayed by one clock period. The driver enable circuit 162 selects one of two signals FP0 or FP1 according to the states of CM and CML, as explained below. The FP0 and FP1 signals are the positive and complementary outputs of an FP latch 165. The latch 165 is used to provide an identification of the channel pair. If set, the latch 165 activates the FPO signal indicating that the channel pair is channel pair zero. If reset, complementary signal indicates that the channel pair is channel pair 1. Assume that the channel pair 29 is channel pair 1. In this case, FP0=0 and FP1=1.

The operations of the channel pair 29 are controlled by circuitry including a request stack 166, input and output data control logic 168 and 169, and a state machine circuit including a state machine 171 and a state machine counter 172. The state machine 171 also drives an error logic circuit 174, which, in turn, drives one of the two check signal interfaces, denoted in FIG. 9 as check 1. The error circuit also produces a signal S1. The signal S1 is an indication to the other channel pair 28 of an error condition in channel pair 29. Similarly, channel pair 28 provide a signal S0 to the channel pair 29. When active, S1 indicates an error condition in the channel pair 29.

The CM and CML signals are provided directly to the state machine 171, together with the FP0 and FP1 signals produced by the latch 165 and the signal output by the request stack 166 as MAX COUNT indicative of the bytes to be transferred from the channel pair 29 in providing a trap for response frame to the SHCP. The state machine 171 also receives error indications in the form the S0 signals from the channel pair 28 and an internal error signal (INT ERROR). The INT ERROR signal is developed by a conventional error monitoring circuit 173 in the channel pair 29, to indicate the existence of predetermined error conditions within the channel pair.

The input data control logic 168 receives an input from the request stack 166, which indicates that an input request is available from the encoder 152 for transmission on the bus 32. The input data control logic 168 also receives the current state signal output by the state machine 171, together with the current count held in the COUNT register 172. The output of the input data control logic 168 is provided as a select signal to the multiplexer 155 to select one of the three signal lines 143, 146, or 153.

The output data control logic 169 receives the current state signal from the state machine 171, together with the current count from the COUNT register 172, and provides a gating signal to the output register 143.

The error logic 174 receives the current state signal from the state machine 171 and encodes it appropriately to set the check 1 signal line when an error condition is indicated by the current state of the state machine.

An input request is generated by response of either of the channel controllers 140 or 142 to an output command. A controller responds to an output command by providing request information relating to the type of request being made. If no request is being made, a data signal indicating such is produced by the controller. It will be recalled, particularly with reference to FIG. 4B, that the input request byte is position-coded to indicate the origin of the request. Thus, a request from channel pair 28, assuming it is pair 0, is in bits zero-3 of the request byte, while bits 4-7 hold the input request for the channel pair 29. The four bits are coded to indicate that no request is being made, that an asynchronous response to a preceding asynchronous command will follow, or that a trap for a synchronous command will be sent. The 4 bits provide for coding of up to 8 specific requests, with accompanying parity. When a trap request is encoded, the coded bit pattern indicates how many bytes the trap response will entail. The request information data is output by a controller and provided to a priority circuit 150. The priority circuit 150 undertakes a conventional least-recently-used algorithm to prioritize an input request coding in the event of simultaneous provision of request information by the controllers 140 and 142. The priority signal selects the request information of the prioritized controller by way of the multiplexer 149. The output of the multiplexer, together with the priority bit indicating which channel's request is being encoded, is provided to the request stack 166. Request stack 166 is a simple 4-position delay circuit in which an input request and priority bit are entered into location zero and transitioned through locations 0-1-2-3 in response to each clock cycle signal. When the request reaches location 3 on the third CLK cycle after entry into the stack, the priority bit and request information are provided to the state machine 171 and input data control logic 168. The selected request information is encoded by the encoder 152 into identical 4-bit channel input requests, which are provided through the 8 signal paths of the signal line 153 to the multiplexer 155.

An input request is driven on to the bi-directional data bus 32 through the driver 159. Each of the channel pairs 28 and 29 drives a respective set of four lines of the bus during control mode state 00. The most significant of the bus lines are reserved for the channel pair indicated by the positive sense of FP0, while the four least significant are reserved for the channel denoted by FP1. FIG. 10 illustrates the driver 159 in greater detail, and in conjunction with the drive enable logic 162 and the input register 157. The driver consists of a HI driver 159H and a LO driver 159L. Each of the drivers 159H and 159L drives a respective four signal leads of the bi-directional bus 32 and receives four signal leads of the 8-lead signal path 158. The driver 159H receives the most significant of the four lines of the signal path 158 and drives the most significant four lines of the bi-directional data bus 32. The LO driver 159L receives and drives the least significant four signal lines of the signal path 158 and the bi-directional data bus 32, respectively. In order to properly position the four bits of output requests transferred by the channel pair 29, the HI and LO drivers 159H and 159L are driven by respective enable signals, DRIVE HI and DRIVE LO, both produced by the driver enable logic 162 in response to the CM and CML signals. The two drive signals are generated by the driver enable circuit according to the logic diagram of FIG. 11, which shows the condition of the CM and CML signals under which the drive signals are generated. The drive HI and drive LO signals are generated identically when CML/CM combinations are 10/10 and 11/11. However, when a combination is 00/00, the FP0 signal is provided as the DRIVE HI enable signal, while the FP1 signal is provided as the DRIVE LO signal. Thus, during the input request mode of the bi-directional data bus 32, the input request of channel pair 29 will be provided through the drive 159L, if channel 29 is designated as channel pair one, and through the driver 159H, otherwise.

In each of the channel controllers 140 and 142, input traps and other responses are generated by execution of microcode, not shown, in response to output commands. Either of the controllers is appropriately stimulated to produce a request/trap frame in response to an output command, the appropriate controller responding based upon the channel identification in the output command frame (field 46 in FIG. 4A and CHID in byte 1 of FIG. 4C).

The operation of the channel pair in FIG. 29 will now be described, it being understood that other channel pairs of the I/O system operate virtually identically. The control bus mode 33 is received in the channel pair 29 and latched into the register 164. Data is received and transferred on the bi-directional data bus 32. Data received is latched into the output register 143, while data to be input to the bi-directional data bus 32 is latched into the input register 157.

Control of data into the registers 157 and 143 is controlled by the state machine 171, in combination with the count register 172, and the control logics 168 and 169. Last, the state machine, through the error logic 174, drives the two error outputs: S1 to indicate to the channel pair 28 that an error has occurred; and CHECK 1 which, combined with CHECK 0 from the channel pair 28, is received by the SHCP together, CHECK 0 and CHECK 1, indicate various error conditions. The state of the machine 171 is retained in an internal register (not shown). The contents of this register comprise the signals input to the control logics 168 and 169 by the state machine 171. The next state of the machine 171 is determined by its current state, the value of CML, the contents of the count register, and the error interfaces S0 and INT ERROR.

The state transition sequence of the state machine 171 is illustrated in FIG. 13. Once in a given state, the machine will remain there until a valid set of exit conditions exist. For completeness, the state diagram of FIG. 13 shows all exit conditions, as well as the conditions to stay in a particular state.

The machine is initialized into state 100000 (binary "B"). The machine 171 will remain in this state, and a request byte will be gated into the register 157 for so long as CML equals 00, and no error conditions exist. While in state 100000, the machine 171 will keep the contents of the COUNT register 172 at a magnitude of zero. In response to the zero count and the machine state code, the input data control logic will continuously select the output of the encoder 152 for provision to the input register 157, with the result that the 4-bit input request will be continuously provided to the bi-directional data bus 32. If CML=01, then, on the next clock pulse, a value "F" (hexadecimal) will be gated into the COUNT register 172 and the state will change to 000010. If, however, CML=11 and FP1=1 then, on the next clock pulse, the contents of the COUNT register will be incremented in response to the current machine state, to the count of one. Now, in response to the input request in location 3 of the request stack 166, the input data control logic 168 will select either signal line 143 or 146, according to the channel identified by the priority bit. As a result, the first byte of an input frame will be gated into the input register 157 and the state will change to 010000. If CML=11 and FP1=0, then, on the next clock pulse, the state will change to 000100. If CML=10 and FP0=1, then on the next clock pulse, the count in the register 172 will be incremented by one, the state will change to 010000, and the first input frame byte will be gated into the input register 157. If CML=10 and FP0=0 then, on the next clock pulse, the state will change to 000100.

Once the state=010000, the machine 171 will remain in that state, and the input frame byte corresponding to the value of maxcount will be gated into the register 157. As long as the state is 010000, then the COUNT of the COUNT register 172 will be incremented by one each clock period until the expected number of input frame bytes (indicated by the MAX COUNT) are sent. When MAX COUNT is reached, and CML=11, then the state machine transitions to state 001000.

The machine remains in state 001000 for only one clock period. The COUNT register 172 will be reset to zero ('F', hex) on the next clock pulse, and the machine will change to 000100 if CML=11. (Any value other than 11 for CML will be detected by the machine as a sequence error.)

Once the machine is in state 000100, it will remain in that state, continuously loading a zero into the count register 172 until CML=00. When CML changes to 00, on the next clock pulse the input request will be gated into the input data register 157 and the state will change to 100000.

While the state machine is in state 000100, the output data control logic 169 responds to the gate signal and gates data provided by the receiver 142 into the output register 143. The CIC will assert the 01 CM code for an amount time sufficient to transfer the output command. At the end of its transmission, the CIC will set the CM code to 00. When CML 00, the state machine 171 will transition back to state 100000. If the count does not equal 1 when CML=00, the machine will generate an internal error.

The preceding discussion assumes that the channel pair 29 is operating normally. In the event that an error condition occurs, the state machine 171 will undertake an error escape from any of its normal states to the state 000001. This is illustrated in FIG. 13. At least three types of error conditions will cause an error escape. The first of error is detection of an internal error by the circuit 173. This can include, for example, detection of incorrect parity. A second type of error is a sequence error, resulting from an incorrect sequence transition of the control mode code. Incorrect sequence transitions will cause the state machine 171 to detect sequence error, according to the transition table illustrated in FIG. 12. Either of these two first types of errors will cause error circuit 174 to raise the S1 signal. The third type of error condition is activation of the S0 signal by the channel pair 28. Activation of the S0 signal is echoed back by activation of the S1 signal by the response of the error logic 174 to the state machine's entering state 000001 The state machine will stay in this state for so long as S0 is asserted and will transition back to state 100000 when S0 drops.

Whenever an internal error or sequence error is detected, the state machine 171 transitions to state 000001 and remains there until the error condition is eliminated.

When the state machine 171 enters the error state, the error logic immediately raises the S1 signal, but pauses one clock period before raising the CHECK1 signal. The one cycle pause provides the channel pair 28 with time to enter an error state so that the CHECK0 and CHECK1 signals will be activated simultaneously. If the error condition causing the entry into the error state expires, the S1 signal and check 1 signals will be deactivated (simultaneously with the S0 and CHECK 0 signals); however the state machine will remain in the error state until CML = 00 indicating that the CIC has responded to the check signal interface activation. The sole exception is when the error state is entered in response to an internal error of a predetermined classification. In this regard, it is asserted that the internal error checking circuit 173 is capable of classifying errors. When the internal error signal indicates that the error is of a certain class including serious machine malfunctions, the state machine remains in the error state until reset by external means.

DATA TRANSFER BETWEEN CHANNEL AND CDB

To pass information over the interface between the channel and its associated CDB, an IFA uses the SYNC and ACCEPT control lines and the bi-directional databus to establish a mode of data transfer and to communicate data between the two points. Data is passed on the bi-directional databus connecting the channel and its CDB. In addition, the CDB returns a parity signal, consisting of a single bit, indicating the parity of the SYNC and ACCEPT signals during the previous cycle of the CLK signal.

FIGS. 14 and 15 illustrate the state transition diagram for a bi-directional data bus connecting as a channel and a CDB. In FIG. 15, the bus has a first state, denoted as IDLE. In the idle state, the channel is awaiting an I/O process command to be sent by SHCP. When the command is received, the channel transitions to a set data mode (SDM) state during which the channel and its associated CDB are prepared for data transfer. Following SDM, the channel transitions the bus to a data mode state (DM) during which data is transferred either to or from the CDB. Data transferred to the CDB is denoted as input data, while data transferred to the channel is output data. When the data transfer is complete, the channel transitions the bus to a reset data mode state (RDM) which ends the data transfer and causes the CDB to send certain control information to the channel. The channel checks the information to make sure that the data transfer was completed successfully. If the transfer was successful, the channel transitions the bus to the IDLE state.

FIG. 14 illustrates how the SYNC and ACCEPT signals are used to define the bus state. In explaining FIG. 13, reference will be made to channel 10 of channel pair 29 in FIG. 1, it being understood that the explanation applies also to each channel in the I/O system. Again, it is asserted that the channel 10 and CDB 31a both receive CLK signals for synchronization of operations. As shown in FIG. 14, the SYNC signal is set high at every eighth cycle of the CLK signal. This is referred to hereinafter as a "sync cycle". The state of the bi-directional databus 38 is established by a time relationship between the ACCEPT and SYNC signals. Each time the SYNC signal is pulsed, reference is made to the ACCEPT signal for that clock period and the next seven clock periods. As long as the ACCEPT signal line is not activated, the IDLE state is signified. If, however, the ACCEPT signal is activated on the second CLK period following a SYNC signal pulse, and kept high for the next five CLK cycles, the SDM state is recognized. The SDM state persists for eight CLK cycles only, with the first SYNC cycle following the SDM state signifying the beginning of the DM state. During each CLK cycle of the DM state, one byte of data can be transferred on the bi-bus 38 if the ACCEPT line is active. When the ACCEPT ACTIVE is inactivated, it must remain inactive until the next SYNC pulse. The RDM state is signified by raising the ACCEPT signal line during the first CLK cycle after the SYNC pulse following the DM state. During the RDM state, the ACCEPT signal is kept high for all seven of the CLK cycles following the SYNC pulse. Following the RDM state, the channel imposes at least one IDLE state on the bi-directional bus.

Figure 16A:
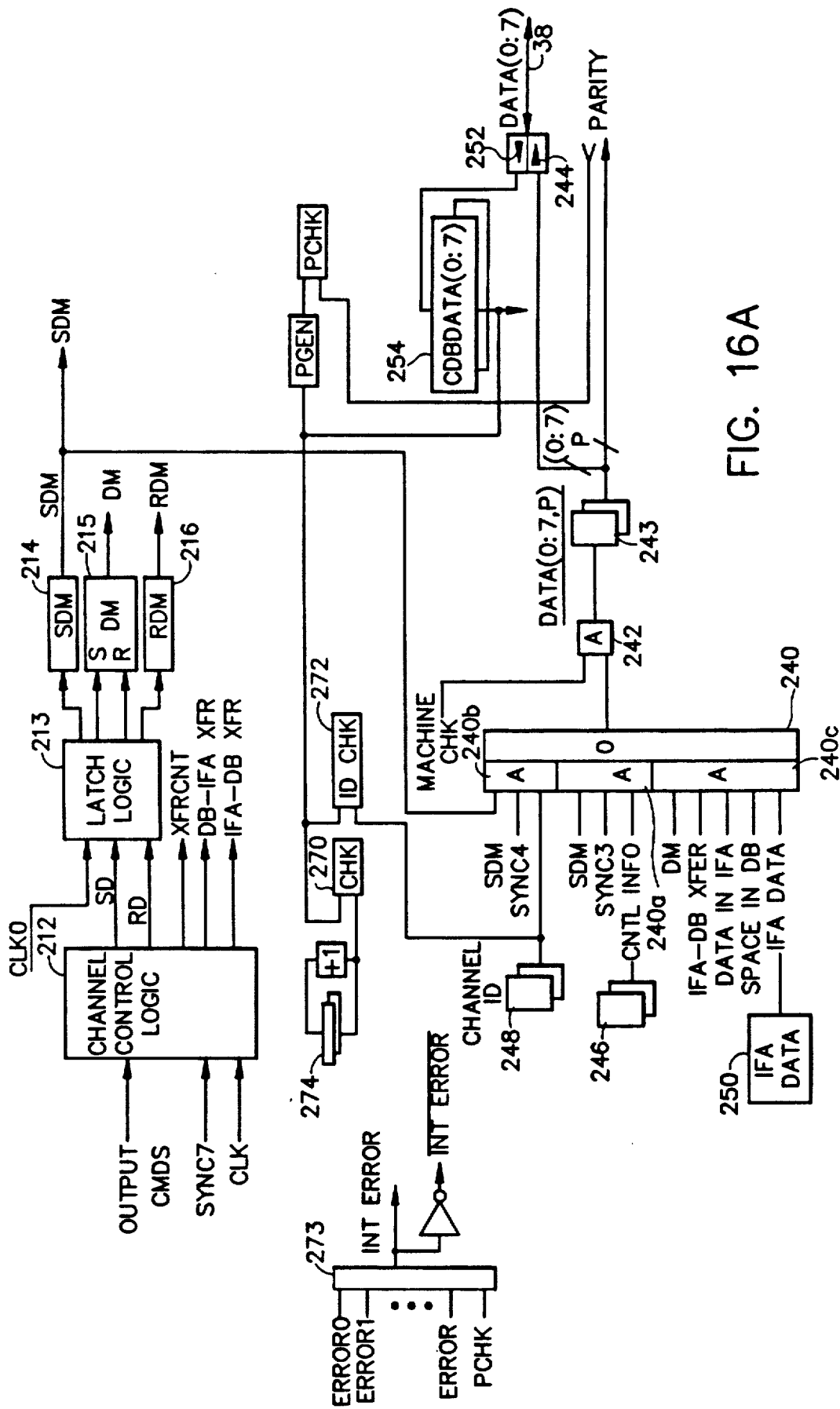
FIGS. 16A and B together constitute a block diagram illustrating channel circuitry which connects to the data transfer bus of FIG. 1.
Figure 16B:
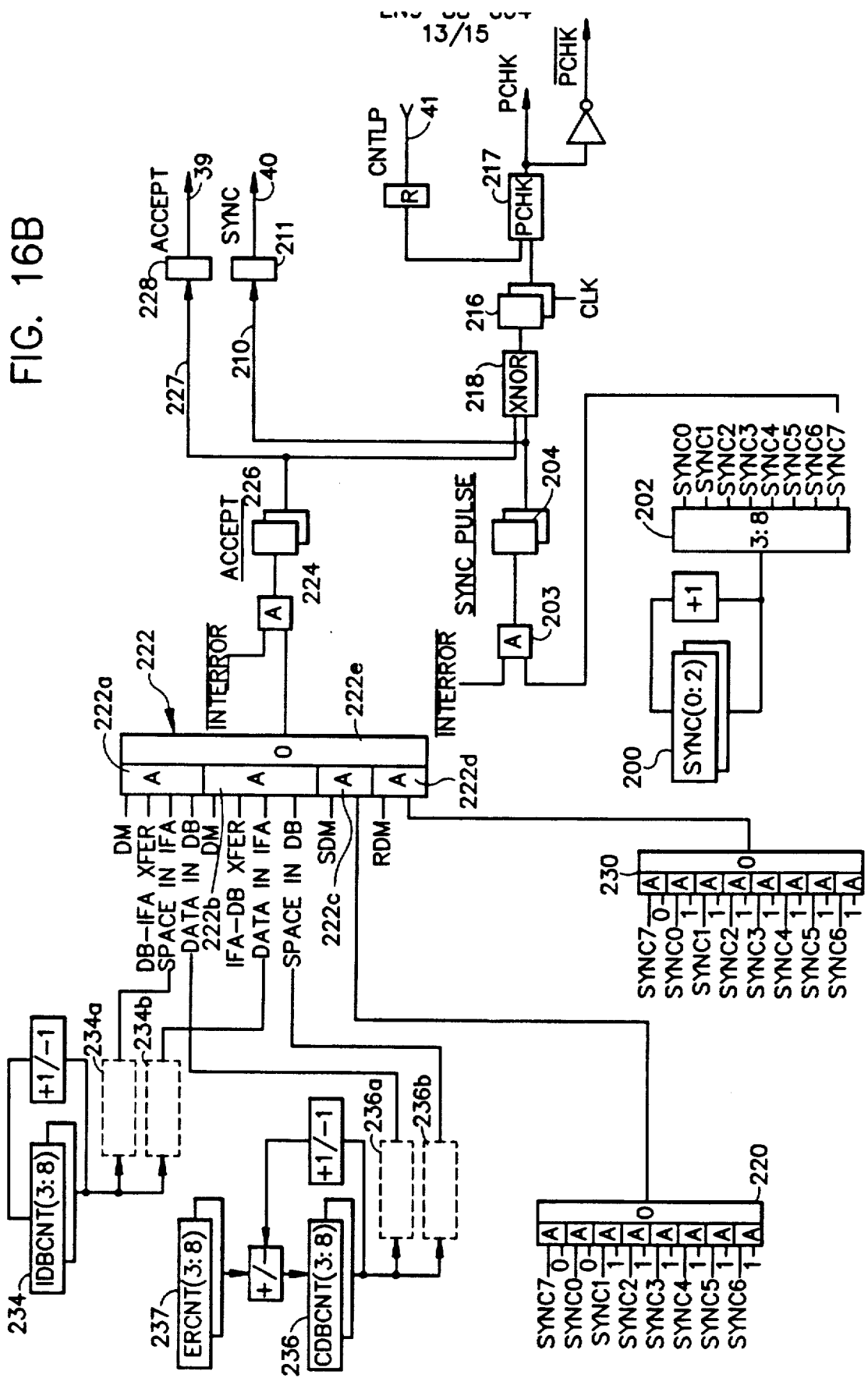

Refer now to FIGS. 16A and B for an understanding of the transfer of data between an IFA channel and its associated CDB, from the standpoint of the channel. In FIG. 16B, the sync pulse for the channel is generated by circuitry including a counter 200, a decoder 202, AND gate 203, a sync pulse latch 204, and a signal lead 210 connected to a conventional driver 211 which drives the sync line for the channel. The counter 200 is a conventional three-bit counter which counts conventionally and cyclically from zero through seven, incrementing the count once each pulse of the CLK signal. When seven is reached, the counter transitions to zero and counts again. The decoder 202 conventionally decodes the current count of the counter 200 and activates one of eight sync lines for the duration of the CLK period during which the counter 200 holds the corresponding count. In order to provide the sync pulse, the sync line at the sync zero time slot, the SYNC7 pulse, is fed through the AND gate 203 to the latch 204. The pulse is fed to the signal line 210 and the driver 211 concurrently with the activation of the SYNC0 output of the decoder 202. This provides the sync pulse from the sync line in the manner illustrated in FIG. 15.

Output commands received by the IFA in the manner described above in connection with FIG. 9 are decoded by the channel controller 212. The channel commands include information identifying a channel. Some of these commands will include data transfer commands requiring transfer of data between the identified channel and its associated CDB. Although not illustrated, the channel of FIG. 16 includes a buffer for receiving data transferred to the channel from an I/O device and for receiving data transferred from the CDB. Upon decoding the command, channel controller 212 will know whether the data transfer is to the CDB (IFA-DB XFER) or from the CDB (DB-IFA XFER). The channel controller will also provide two latch set signals SD and RD in sequence and in synchronization with the SYNC7 signal to latch set logic 213. The SD signal is provided to the latch set logic during CLK 4 of the idle state, during which the data transfer command is decoded. The latch logic 213 sets the SDM latch 214 on line 214a synchronously with CLK0 of the SDM cycle, as illustrated in FIG. 14. At the end of the SDM cycle, the latch logic 213 will reset the SDM latch 214 and set the DM latch 215 simultaneously with CLK 0 at the beginning of the DM period. Last, the controller 212 will provide a latch setting signal RD during the last sync sequence of the DM cycle, the last SYNC sequence being determined by the length of the data transfer. The latch logic 213 responds to the RD signal by resetting the DM latch 215 and setting the RDM latch during CLK 0 of the first sync cycle following the last DM cycle, thereby marking the beginning of the RDM cycle. The latch logic 213 resets the RDM latch 216 during CLK 0 of the first sync period following the RDM cycle. The latches 214, 215, and 216 provide signals SDM, DM, and RDM, in a sequence corresponding to the sequence of states illustrated in FIG. 15, and discussed above.

Production of the ACCEPT signal during the SDM and RDM cycles can be understood with reference to FIGS. 16A and B. In FIGS. 16A and B, a first AND/OR gate combination 220 has eight AND gates, each receiving one of the SYNC signals output by the decoder 202, together with a digital bit having a value of "0" for the SYNC7 and SYNC0 signals, and a value of "1" for the SYNC1-SYNC6 signals. The outputs of the AND gates are provided to a single OR gate, which is fed to an AND/OR gate combination 222. The output of the OR gate 220 is fed to AND gate 222c, together with the SDM signal to produce the sync/accept pattern illustrated in FIG. 14, which signifies the SDM state. As shown in FIG. 14, the ACCEPT signal is fed forward from the AND gate 222c, through the OR gate 222e, the AND gate 224, the latch 226, the signal line 227, to the driver 228, whence the signal is fed to the ACCEPT signal line. The AND gates of the AND/OR combination 220 cause the output of the OR gate to remain inactive while the SYNC7 and SYNC0 signals are activated by the decoder 202. The output then activates from SYNC 1 through SYNC 6. The one CLK period required by the accept latch 226 delays the signal output by the OR gate 220 for one CLK cycle, thereby providing the phasing of the ACCEPT signal as illustrated during the SDM state of FIG. 14. During the RDM period, the AND gate 222d channels the output of the OR in the AND/OR gate combination 230 to the ACCEPT driver 228 on the signal path described above for the output of the OR gate 220. The difference between the outputs of the OR gates 220 and 230 is activation of the OR gate 230 from SYNC 0 through SYNC 6. Again, the delay through the accept latch 226 provides the ACCEPT signal pattern illustrated in the RDM state of FIG. 14.

A pair of registers 234 and 236 have contents indicating, respectively, the amount of I/O data being stored in the channel and its CDB. Implicitly, then, assuming that the maximum capacity of each for storage of I/O data is known, the contents of the registers provide the current capacity of the channel and the CDB for storage of additional data. The channel has a local buffer (not shown) into which is placed data received from the CDB for transfer to an I/O device, or from an I/O device for transfer to the CDB. Initially, the count in register 234 starts at zero For each byte which is entered into the channel's buffer, the count is incremented by one (+1); for each byte transferred out, the count is decremented by one (−1). When a data transfer command is decoded by the channel controller, the byte count for the data to be transferred is provided to the storage space circuit 234a. If the sum of the contents of the data buffer counter 234 and the byte count provided by the controller 212 does not exceed the threshold corresponding to the maximum capacity of the buffer, the storage space circuit 234a activates a signal SPACE IN IFA, indicating that the unused capacity of the local buffer will accommodate the amount of data to be transferred from the CDB to the channel.

When the data transfer command requires an input of data to the CDB from the channel, the byte count of the data to be transferred is compared against the contents of the register 234 to insure that the input data has been lodged in the local buffer. When the first byte of the data is in the buffer, the circuit 234b raises a signal DATA IN IFA.

The contents of the register 236 indicate the amount of data currently occupying storage space in the CDB. Recall that the CDB transfers data to and from the main storage; the transfer activity between the CDB and the main storage must be monitored to insure that there is space in the CDB to receive data from the channel, or that there is data in the CDB to be transferred to the channel. The contents of the register 236 provide these indications, and are incremented in two ways. When there is a count in the register 236 and there is an ongoing data transfer between the CDB and the channel, the register count is incremented by +1 each time a byte of data is input to the CDB from the channel, and is decremented by −1 each time a byte is transferred in the opposite direction. The contents of the register 236 are also incremented or decremented by the contents of a transfer count (XFERCNT) register 237 which is loaded by the channel controller microprogram with a number corresponding to the number of bytes of data transferred between the CDB and main storage. If the data are transferred to main storage, the contents of the register 237 are subtracted from the contents of the register 236. If data has been moved to the CDB from main storage, the contents of the register 236 are incremented by the value in the register 237. Now, when data are to be output from the CDB to the channel, the comparator circuit 236a compares the number of bytes currently stored in the CDB against the number of bytes to be transferred, and the circuit activates a signal DATA IN DB when the byte count in the CDB indicates the presence of at least one of the bytes to be transferred.

When data are to be input to the CDB from the channel, the comparator circuit 236b compares the available storage capacity in the CDB against the number of bytes to be transferred from the channel, and activates a signal SPACE IN DB when the current capacity of the CDB can accommodate at least one of the bytes to be transferred from the channel.

During the data mode state of the state transition diagram of FIG. 14, the ACCEPT line is kept active for so long as bytes of data are to be transferred between the CDB and the channel. When the transfer is an input transfer data to the CDB, the AND gate 222b controls the state of the ACCEPT signal. When data are output to the channel, the AND gate 222a determines the state of the ACCEPT signal. The AND gate 222b receives the signals DM, DATA IN IFA, SPACE IN DB, and a signal IFA-DB XFER. This latter signal is activated when the controller decodes a data transfer signal requiring input of data to the CDB from the channel.

When the DM state is entered under these circumstances and there is both data in the local buffer of the channel and space in the CDB, the output of the AND gate activates, and is passed through the OR gate 222, AND gate 224, ACCEPT latch 226, and driver 228 onto the ACCEPT signal line 39. The IFA-DB XFER signal will be activated at CLK 0 of the first sync cycle of the DM state, and will be maintained in an active state for a number of consecutive CLK periods equal to the number of bytes to be transferred. When the CDB detects the DM state, and the direction of data transfer is channel to CDB, the CDB inspects the ACCEPT line for continuous activation of the ACCEPT signal. During each clock period of the DM state when the ACCEPT signal is continuously active, the CDB will ACCEPT a byte of data. If the ACCEPT signal is deactivated, the CDB will not accept data until the next DM cycle.

When the direction of data transfer is channel to the CDB, the AND gate 222a activates its output in response to activation of the signals DM, SPACE IN IFA, DATA IN DB, and DB-IFA XFER. This latter signal is provided by the channel controller to indicate the direction of data transfer. This signal will be maintained for the number of clock periods equal to the number of bytes to be transferred to the CDB. The output of the AND gate 222a will be activated by the DB-IFA XFER signal concurrently with the SYNC signal initiating the first SYNC cycle of the DM state during which data is to be transferred. The output of the AND gate 222a will condition the ACCEPT signal through the signal path described above and maintain it active for the duration of the data transfer.

The CDB is informed of the type of data transfer during the SDM state. As illustrated in FIG. 14, at CLK period 4 of the SDM state, control information is passed from the channel to the CDB. The information passed is a two-bit signal coded to indicate that the data to be transferred during the following DM state will be input to or output from the CDB. In the following CLK period, period 5, the channel provides its identification code (CHID) to the CDB. This is a two-bit code condition to identify the channel. This control and identification information is passed on the bi-directional databus 38 through the data path AND/OR gate combination 240, AND gate 242, DATA latch 243, and driver 244, whence the information is placed on the databus 38. The control information is provided through AND gate 240a, while the channel ID is passed through the AND gate 240b. The control information is obtained from a two-bit storage device 246, whose output is input to the gate 240a, together with SDM and SYNC 3 signals. Thus, the contents of the storage device 246 will be placed out on the databus 38 during the period CLK 4, due to the one-cycle delay through the latch 243. The channel ID information is obtained from two-bit storage device 248 and is passed through the AND gate 240b when the SDM and SYNC 4 signals are activated. The channel ID information will be delayed one bit through the latch 243 and placed out on to the databus 38 during the sixth clock cycle of the SDM state.

The local channel data buffer is requested by the IFA DATA block 250; it consists of a conventional addressable storage resource, addressing circuitry, and read/write strobing circuitry. The local data buffer 250 is operated to transfer message data byte-by-byte through the AND gate 240c when the signals DM, IFA-DB XFER, DATA IN IFA, and SPACE IN DB are active.

The input data message is transferred through the AND/OR gate combination 240 by way of the AND gate 242, the eight-bit latch 243, and the eight-bit driver 244.

Data is staged into the channel and to the local buffer 250 through the transfer path databus 38, receiver 252, and CDB data register 254.

When an internal error for the channel pair containing the channel of FIGS. 16A and B is detected, the error check circuit 273 activates the internal error (INT ERROR) signal. This causes deactivation of the complement of this signal, resulting of closure of AND gates 203 and 242. Thus, the error response of each channel is to deactivate the SYNC and ACCEPT lines, and to interrupt or prevent the transfer of data to the CDB from the channel.

The validity of data transfer between the channel and its CDB is determined in two ways. First, a one-bit control parity signal is returned from the CDB on the parity signal line 41. The signal on this line represents the CDB's evaluation of the parity between the ACCEPT and SYNC signals for each clock period. Since these signals must be latched at the CDB, the parity signal on the signal line 41 represents, at the channel, the parity for the ACCEPT and SYNC signals during the preceding clock period. The parity returned from the CDB is checked by determining the parity for the ACCEPT and SYNC signals, the exclusive nor (XNOR) circuit 218, and then latching the parity in the latch 216. The latch 216 delays the parity signal for one clock period. Therefore, the output of the latch 216 is the channel's view of parity for the ACCEPT and SYNC signals for the clock period represented by the current condition of the parity control signal line 41. The output of the latch 216 and the parity signal on the signal line 41 are compared in a parity check (PCHK) circuit 217. The circuit 217 is essentially a comparator which sets a signal PCHK when its inputs are unequal, thus indicating disparity, and an error condition. This signal is one of the error conditions fed to the error checking circuit 273.

The second procedure for checking the integrity of data transfer between the channel and the CDB is given by two check circuits 270 and 272. Refer to FIG. 14 and to FIG. 16 for an understanding of this validity check. During the fifth and sixth CLK cycles of the RDM state, the CDB returns to the channel a COUNT signal and the CHID code forwarded by the channel during the SDM state. The COUNT signal is a number representing the number of data bytes transferred to or from the CDB during the preceding DM state. The count is held in the CDB register 254 for one clock cycle, during which it is provided to the COUNT CHECK circuit 270. The COUNT CHECK circuit compares the count returned by the CDB against a COUNT value in register 274, which is loaded by the channel controller 212 during the SDM state with a value equal to the number of bytes to be transferred during the DM state. The two values are compared, and a count check signal is activated if the values are unequal. In the next clock cycle, the output of the ID CHECK circuit 272 is inspected and if active, the output indicates that the CHID returned by the CDB is unequal to the CHID stored in the storage circuit 243. Both the count check and ID check signals are provided to the internal error circuit 273 for appropriate response.

Figure 17:
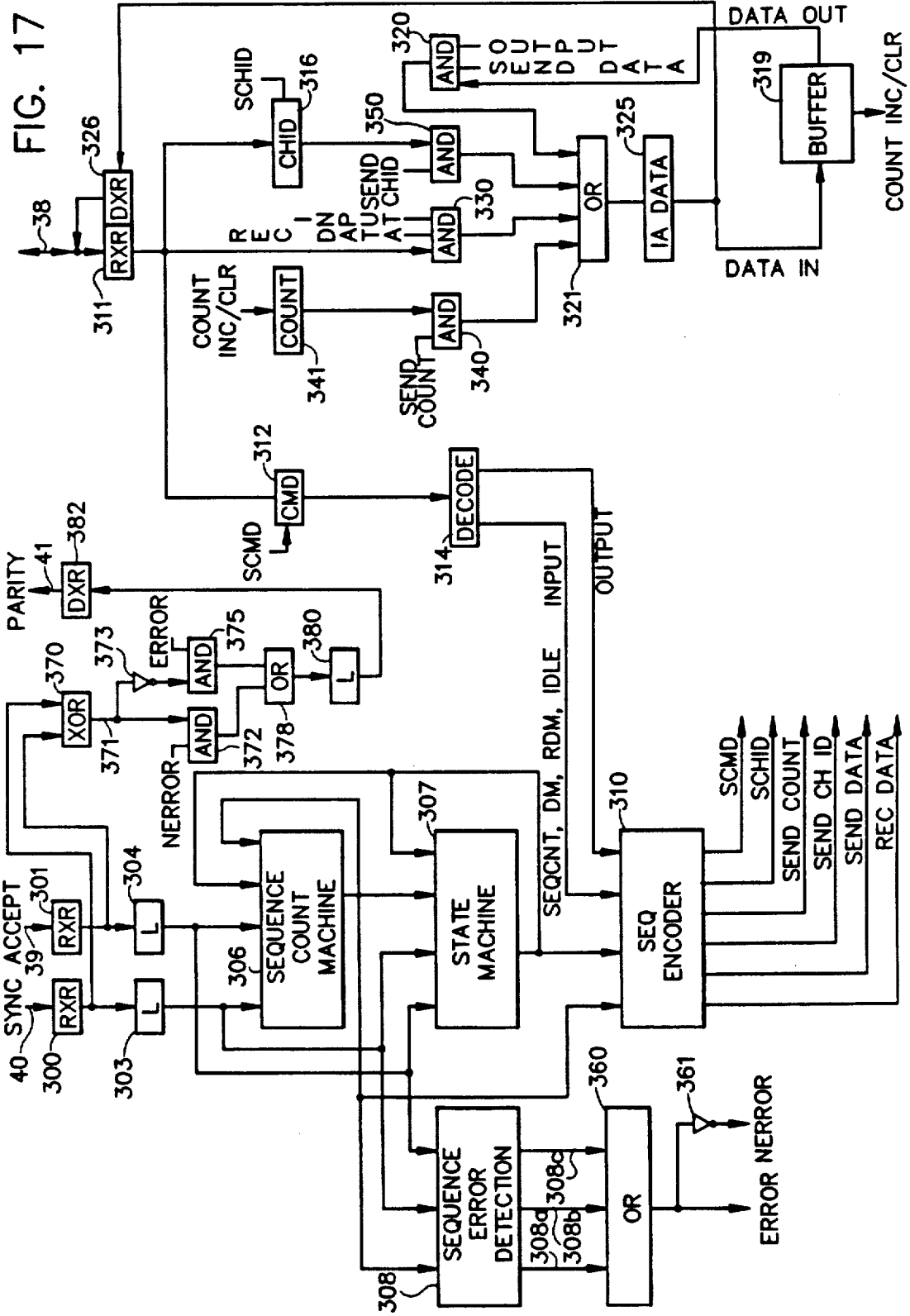
FIG. 17 is a block diagram illustrating channel data bus circuitry which connects to the data transfer bus of FIG. 1.

Reference now to FIG. 17 will provide an understanding of the portion of a CDB which exchanges data with its associated channel according to a protocol established by a multi-state transition sequence. It is understood that this explanation applies to each CDB in the I/O system. Further, it is asserted that all of the sequential or storage circuitry to be described operates in response to the CLK clock signal distributed throughout the I/O system. For the sake of continuity, the explanation of FIG. 17 assumes that the CDB being described is the CDB 31a that interfaces with the channel "10" of channel pair 29, as illustrated in FIG. 1.

The CDB 31a includes a pair of line receivers 300 and 301 terminating, respectively, the SYNC and ACCEPT lines 40 and 39. These receivers feed, respectively, latches 303 and 304. The outputs of the latches 303 and 304 are fed to a sequence count machine 306, a state machine 307 and a sequence error detection circuit 308. The state machine 307 and the sequence machine 306 operate cooperatively to follow the data transfer protocol described hereinabove with regard to the channel 10. The state machine follows a state transition sequence illustrated in FIG. 18. Initially, the state machine 307 is in the idle sequence. Whenever the SYNC line 40 pulses (every eight cycles of CLK), then a transition to the SEQUENCE COUNT state occurs. If the ACCEPT line indicates that a set data mode sequence is occurring, a transition to the DATA MODE state occurs when the set data mode sequence is completed. If, during the DATA MODE state, a non-data frame is detected, a transition to the RESET DATA MODE state occurs. Upon detection of a complete reset data mode sequence, a transition to the IDLE state occurs. As explained above, the SYNC line is pulsed every eight CLK cycles. The ACCEPT line provides a control signal whose time relationship with the SYNC signal controls the non-datamode states of the CDB. When the CDB is in data mode, the ACCEPT line asserted means that a data byte will be, or is being, transferred on the bi-directional databus 38. As explained above, the ACCEPT line is asserted, if data is to be transferred, on the first cycle of the data mode state, and can be asserted for all or a remaining part of the eight cycle data frame. For input of data to the CDB from the channel, the ACCEPT line and data byte are valid and transferred on the same cycle to the CDB. For an output data frame, the ACCEPT line leads the data byte by one cycle. At anytime the state machine 307 outputs one of four possible state signals: SEQCNT, DM, RDM, and IDLE, denoting respectively, sequence count, data mode, reset data mode, and idle states. When the state machine is in the idle state, the sequence count machine 306 will respond to a SYNC pulse by beginning a sequence count, the sequence count being indicated on the output of the count machine. 306, which places the state machine in the SEQCNT state. In the sequence count state, the machine 306 samples the condition of the ACCEPT latch 304 once each clock period to follow the state transition sequence of FIG. 19. In FIG. 19, transition between states is indicated by input/output, with the input being the ACCEPT latch state and the output being a SET DATA MODE signal which is output by the sequence count machine 306 to the state machine 307, and which is fed back to the sequence count machine 306. As FIG. 19 illustrates, the sequence count mode is an eight-state sequence in which the first two transitions depend upon the ACCEPT signal being reset, and the remaining six transitions being made is response to the active state of the ACCEPT signal. In the transition between states SEQ 7 and SEQ 8, the SET DATA MODE is provided, causing the state machine to transition to the DATA MODE state and to output the DM signal, which is fed forward to the sequence count machine 306 and fed back to the state machine 307.

When the state machine 307 is in the data mode state, the sequence count machine 306 follows the eight-state sequence of FIG. 20 so long as the ACCEPT latch is set concurrently with the SYNC signal in the IDLE/DATA 8 state. Transitions between states are controlled by the ACCEPT input. If the ACCEPT line is active, a successful data transfer has occurred. Once the ACCEPT line is not asserted, the cycle completes, but the ACCEPT line cannot be reasserted for the remaining states of the cycle.

When a RESET DATA MODE frame is received, the state machine outputs the RDM signal, feeding it back to itself and feeding it forward to the sequence count machine 306.

When the state machine 307 is in the RDM state, the sequence count machine 306 follows the sequence illustrated in FIG. 21, where state transitions are indicated by a signal pair input/output, the input signal being the ACCEPT latch output, and the output signal being the RESET DATA MODE signal which is fed forward to the state machine 307 and back to the sequence count machine 306. The initial state of the reset data mode sequence of FIG. 21 is the IDLE/RST 8 state, with the transition to the first state of the sequence, RST 1, occurring in response to an inactive ACCEPT line concurrent with an active SYNC line. All following transitions require an active ACCEPT line, and the transition between RST 7 and RST 8 results in production of the RST DATA MODE signal, which sends the state machine 307 back to its idle state and the sequence count machine back to the idle state of FIG. 19.

The outputs of the state machine 307 and sequence count machine 306 are fed to a sequence encoder 310 comprising conventional combinatorial logic which responds to the machine outputs and to a pair of signals called INPUT and OUTPUT, produce a sequence of control signals. Referring to the sequence count state diagram of FIG. 19, the sequence encoder 310 produces a signal SCMD during state SEQ 4, and the signal SCHID during state SEQ 5. The SCMD signal gates a byte of data coupled from the bi-directional databus 38 through the receiver 311 into a command register (CMD) 312. It will be recalled that the channel transfers a control code indicating the direction of data transfer during the fifth cycle of the SET DATA MODE state. This control code is in a byte captured in the register 312, and is decoded by the DECODE circuit 314. The decode circuit 314 activates the INPUT signal if the data transfer is from the channel to the CDB, and the OUTPUT signal if the transfer is oppositely-directed. The SCHID signal captures the CHID code from the bus 38 an the byte following the control byte, during the SET DATA MODE sequence. The SCHID signal is captured in a register 316 and held there until the next SCHID is captured.

In the DATA MODE sequence of FIG. 20, the SEND DATA signals are activated by the encoder 310 according to the state of the INPUT and OUTPUT signals. If the OUTPUT signal is activated, the SEND DATA signal is set by the encoder 310. If the INPUT signal is active, the REC DATA signal is activated. The SEND DATA and OUTPUT signals activate an AND circuit 320 to gate output data (DATA OUT) from a buffer 319 through an OR circuit 321 then on to the bi-directional databus 38 by way of a one-cycle byte-wide interface adapter (IA DATA) register 325 and a byte-wide driver 326.

If the direction of data is into the CDB, the AND gate 330 is activated by the REC DATA and INPUT signal which allow the gate to direct data from the bus 38 through the receiver 311, the gate 330, OR circuit 321, the IA DATA register 325 and into the buffer 319.

In the reset data mode sequence, the encoder 310 activates SEND COUNT and SEND CHID signals during states 5 and 6, respectively, of the sequence. The SEND COUNT signal activates an AND gate 340, placing the contents of a five-bit count counter/register circuit 341 onto the bi-directional databus 38 through the OR gate 321, register 325, and driver 326. The contents of the COUNT register contain a count representation of the number of bytes transferred into or out of the buffer 319. The register 341 is initialized at the beginning of a data transfer and incremented by one each time a byte of data is transferred into or out of the buffer 319. At the end of the data transfer, the count is provided, during the reset data mode state, back to the channel for comparison as described above.

The SEND CHID signal produced by the encoder 310 in state RST 6, activates the contents of the CHID register 316 back onto the bi-directional databus 38 in the reset data mode CLK signal following that during which the COUNT data is transferred.

The sequence error detection circuit 308 detects errors during any of the three sequences illustrated in FIGS. 19-21, providing a respective error signal for each of the three sequences. The three error signals are output on signal lines 308a, b, and c; activation of any of these error lines will be maintained for the duration of the sequence and fed by an OR gate 360 to a parity circuit. The output of the OR gate 360, if activated, produces an ERROR signal, indicating detection of error in one of the sequences. If the signal is inactive, the inverter 361 activates a signal NERROR, signifying that no error has been detected.

The parity detection circuit which drives the parity line 41 consists of an exclusive-OR (XOR) gate 370, which produces odd parity for the two lines on an output signal line 371 which is combined by an AND gate 372 with the NERROR signal. The parity check circuit 217 of FIG. 16 checks odd parity. Even parity of the ACCEPT AND SYNC lines is indicated by the output of the inverter 373, which inverts and feeds the output of the XOR circuit 370 to an AND gate 375. The AND gate 375 combines the even parity signal with the ERROR signal. The outputs of the two AND gates 372 and 375 are fed forward to a parity latch 380 through an OR gate 378, and then on to the parity line 41 through a driver 382.

It should be evident that the parity circuit of the CDB illustrated in FIG. 17 will provide odd parity when there are no sequence error conditions, and even parity when sequence error conditions are detected. Thus, the switch from odd to even parity is a means of signifying to the channel that an error condition has occurred in the CDB. The error will be fed by the parity check circuit in the channel to the channel's internal error circuitry, which will shut down channel operations. Further, the error will be fed from the channel pair containing the channel back to the SHCP by way of the check lines of the channel pair.

On the other hand, if there are no sequence error conditions in the CDB and the odd parity sent back to the channel is incorrect, the channel will react to the incorrect parity as just described.

While we have described a preferred embodiment of our invention, it should be understood that modifications and adapations thereof will occur to persons skilled in the art. Therefore, the protection afforded my invention should only be limited in accordance with the scope of the following claims.

We claim:

1. In a computer input/output (I/O) system for transferring data between a computer main store and a plurality of I/O devices in response to system I/O commands provided by a computer instruction unit, said I/O system including a plurality of channel data buffers (CDB), each CDB connected to the main store for buffering I/O data to and from the main store, translation means connected to said instruction unit for translating system I/O commands to process commands, and a plurality of I/O interface adaptors (IFA), each IFA including a plurality of I/O channels, each I/O channel connected to a CDB for exchanging I/O data with the CDB, a multi-mode I/O process control bus system, comprising:

a plurality of bi-directional buses, each bi-directional bus connected to a respective one of said IFAs for conducting I/O process commands to said respective one of said IFAs and for conducting channel requests and channel responses from said respective one of said IFAs;

a plurality of control mode signal buses, each control mode signal bus connected to a a respective one of said IFAs for conducting control mode signals to said respective one of said IFAs, said control mode signals indicating a mode of operation for the respective bi-directional bus also connected to said respective one of said IFAs;

a multiprocessing, channel interface control (CIC) transfer means connected to said translation means and responsive to said I/O process commands and to channel requests for producing server control signals for a plurality of I/O channels, said server control signals including first server control signals indicating a first mode of operation in which a bi-directional bus conducts channel requests from the IFA to which it is connected, and second server control signals indicating a second mode of operation in which a bi-directional bus conducts process commands to the IFA to which it is connected and channel responses from the IFA to which it is connected;

a plurality of channel servers, each connected to the CIC transfer means and to a respective bi-directional data bus and a respective control mode signal bus for providing first mode signals on said control mode signal bus in response to first server control signals and second mode signals on said control mode signal bus in response to second server control signals, said first mode signals indicating said first mode of operation and said second mode signals indicating said second mode of operation, and including a server bus means connected to said bi-directional bus for providing channel requests to said CIC transfer means in response to said first server control signals and for connecting said CIC transfer means to said bi-directional bus in response to said second server control signals in order to provide process commands to said bi-directional bus and to receive channel responses from said bi-directional bus; and a plurality of IFA control means, each of said IFA control means in a respective IFA and connected to the bi-directional and control mode signal buses connected to said respective IFA for connecting input request signals from a channel in said IFA to said bi-directional bus in response to said first mode signals received on said control mode signal bus and connecting one of the channels of said IFA to said bi-directional bus to receive process commands and to provide channel responses in response to said second mode signals received on said control mode signal bus.

2. In a computer I/O system which transfers data between a computer main store and a plurality of I/O devices under control of I/O process commands, said system including a plurality of I/O interface adaptors (IFA), each IFA including a plurality of I/O channels, each I/O channel including means for exchanging I/O data with the computer main store, a multi-mode I/O process control bus system, comprising:

a multi-processing, channel interface control (CIC) transfer means responsive to said I/O process commands and to IFA channel requests for producing server control signals for a plurality of I/O channels, aid server control signals including first server control signals indicating a first mode of bus operation for providing channel requests from an IFA to said CIC transfer means, and second server control signals indicating a second mode of operation in which process commands are provided to said IFA and channel responses are received from said IFA;

a channel server connected to said CIC transfer means for producing first mode signals in response to said first server control signals and second mode signals in response to said second control signals, said first mode signals indicating said first mode of operation and said second mode signals indicating said second mode of operation;

a bi-directional bus connected to said IFA for conducting I/O process commands to said IFA and for conducting channel requests and channel responses from said IFA;

a control mode signal bus connected to said IFA and to said channel server for conducting said first and said second mode signals to said IFA;

a server bus means in said channel server and connected to said bi-directional bus for providing channel requests from said bi-directional bus to said CIC transfer means in response to said first server control signals and for connecting said CIC transfer means to said bi-directional bus to provide said process commands and to receive said channel requests in response to said second server control signals; and a control means in said IFA and connected to said bi-directional and control mode signal buses for connecting input request signals from said IFA to said bi-directional bus in response to said first mode signals and connecting a channel in said IFA to said bi-directional bus to receive process commands and to provide channel responses in response to said second mode signals.

3. The multi-mode I/O process bus system of claim 2, further including:

error means in said IFA for generating a check signal indicating a channel error condition;

a check signal bus connected to said IFA and to said channel server for conducting said check signal from said IFA to said channel server; and means in said channel server for disconnecting said CIC transfer means from said bi-directional bus in response to said check signal.

4. The multi-mode I/O process bus system of claim 2, further including:

error means in said IFA for generating a check signal indicating a channel error condition;

a check signal bus connected to said IFA and to said channel server for conducting said check signal from said IFA to said channel server;

means in said channel server for disconnecting said CIC transfer means from said bi-directional bus in response to said check signal; and wherein said channel server provides said first mode signal in response to said check signal.

5. The multi-mode I/O process bus system of claim 2, further including:

error means in said IFA for generating a check signal indicating a channel error condition;

a check signal bus connected to said IFA and to said channel server for conducting said check signal from said IFA to said channel server; and means in said channel server for disabling said channel server in response to said check signal.

6. The multi-mode I/O process bus system of claim 2, further including:

error means in said IFA for generating a first check signal indicating an error condition in a first IFA channel and a second check signal for a second channel in response to the first check signal;

a check signal bus connected to said IFA and to said channel server for conducting said check signals in parallel from said IFA to said channel server; and means in said channel server connected to said check signal bus for disabling said channel server in response to coincidence of said first and second check signals.

7. The multi-mode I/O process bus system of claim 2, further including:

server control means in said channel server for conditioning said second control signal to a first condition indicating a process command mode of operation in which process commands are provided to said IFA and a second condition indicating a channel response mode of operation in which channel responses are received from said IFA;

a driver in said server bus means connected to said server control means and to said bi-directional bus for providing said process commands to said bi-directional bus in response to said first condition; and a data control circuit in said IFA, connected to said bi-directional and control mode signal buses for conducting said input requests to said bi-directional bus in response to said first mode signals;

said data control circuit further for conducting said channel responses to said bi-directional bus in response to said first condition of said second control signal; and said data control circuit further for conducting said process commands from said bi-directional bus in response to said second condition.

8. In a computer I/O system for transferring data between a computer main store and a plurality of I/O devices, said I/O system including a plurality of I/O channels, a multi-mode data transfer bus system for transferring I/O data between the main store and the I/O channels, comprising:

a plurality of channel data buffers (CDB), each of said CDBs connected to the main store and to a respective I/O channel for buffering I/O data between the main store and the respective I/O channel;

a bi-directional data transfer bus connected to an I/O channel and to a CDB for conducting data transfer mode commands to said CDB during a first transfer mode, and for conducting data between said CDB and said I/O channel during a second transfer mode;

a control signal path connected to said I/O channel and to said CDB for conducting control signals;

control means in said I/O channel for providing a first mode signal signifying said first transfer mode and a second mode signal signifying said second transfer mode;

channel bus means in said I/O channel and connected to said control mans and to said bi-directional data transfer bus for connecting a mode command signal to said bi-directional data transfer bus in response to said first mode signal and for transferring data signals between said I/O channel and said bi-directional data transfer bus in response to said second mode signal;

control signal means in said I/O channel connected to said control means and to said control signal path for providing said first and second control signals with a first time relationship signifying said first transfer mode in response to said first mode signal;

a buffer mode means in said CDB and connected to said control signal path for providing a first transfer mode signal signifying said first transfer mode in response to said first time relationship between said first and second control signals and a second transfer mode signal representative of said second transfer mode in response to said mode command signal; and buffer transfer means connected to said buffer mode means and to said bi-directional data transfer bus for receiving said mode command signal in response to said first transfer mode signal and for transferring data between said CDB and said bi-directional data transfer bus in response to said second transfer mode signal.

9. The multi-mode data transfer system of claim 8, wherein said buffer mode means includes command means connected to said bi-directional data transfer bus and responsive to said first transfer mode signal and to said mode command signal for producing an output data signal or an input signal, and wherein said bus transfer means is connected to said command means for transferring data from said CDB to said bi-directional data transfer bus in response to said output signal and for transferring data from said bi-directional data transfer bus to said CDB in response to said input signal.

10. The multi-mode data transfer system of claim 8, wherein said control means further provides a third control signal indicating a third transfer mode, said control signal means provides said first and second control signals with a second-time relationship signifying said third transfer mode, said buffer mode means providing a third transfer mode signal in response to said second time relationship between said first and second control signals, said multi-mode data transfer system further comprising status information means in said CDB responsive to said third transfer mode signal for connecting status information to said bi-directional data transfer bus.

11. The multi-mode data transfer system of claim 8, further comprising:

check means in said I/O channel connected to said control signal path for combining said first and second control signals to produce a check signal;

a check signal path connected to said check means and to said I/O channel for conducting said check signal to said I/O channel; and interruption means in said I/O channel connected to said check signal path and to said control signal means for preventing provision of said first and second control signals in response to said check signal.

12. In a multi-channel I/O system for a computer, the I/O system for transferring data between a computer main store and a plurality of I/O devices under control of I/O process commands, the system including:

an interface adapter including a plurality of I/O channels, each I/O channel for connection to one or more I/O devices;

a channel processor for controlling a plurality of I/O channels in a plurality of interface adapters;

a channel data buffer connected to the computer main store and to a respective I/O channel of said interface adapter for buffering data between said computer main store and said respective I/O channel;

a first point-to-point control interface connected to said channel processor and to said interface adapter, said first point-to-point interface including two control lines for conducting control signals to said interface adapter from said channel processor and two check lines for conducting check signals from said interface adapter to said channel processor; and a second point-to-point control interface connected to said interface adapter and to said channel data buffer, said second point-to-point interface including two control lines for conducting control signals from said interface adapter to said channel data buffer and one parity line for conducting a parity signal from the channel data buffer to the interface adapter, the parity signal indicative of parity for control signals on said two control lines.

13. The I/O channel control system of claim 12, further including means in the channel data buffer for setting said parity signal to indicate disparity in response to error conditions in said channel data buffer.

14. The I/O channel control system of claim 12, further including control signal means in said interface adaptor and connected to said second point-to-point control interface for generating control signals for connection to said two control lines during a first clock period and check means in said interface adaptor and connected to said control signal means for generating a parity indication for said control signals during said first clock period and for comparing said parity indications with a parity signal during a second clock signal following said first clock period.

* * * * *